United States Patent
Nakamura et al.

(10) Patent No.: US 9,400,029 B2
(45) Date of Patent: Jul. 26, 2016

(54) DAMPER UNIT FOR VESSEL PROPULSION APPARATUS, PROPELLER FOR VESSEL PROPULSION APPARATUS, AND VESSEL PROPULSION APPARATUS

(71) Applicant: YAMAHA HATSUDOKI KABUSHIKI KAISHA, Iwata-shi, Shizuoka (JP)

(72) Inventors: Daisuke Nakamura, Shizuoka (JP); Tiharu Masuda, Shizuoka (JP); Youhei Kuroki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 523 days.

(21) Appl. No.: 13/908,051

(22) Filed: Jun. 3, 2013

(65) Prior Publication Data
US 2014/0023503 A1 Jan. 23, 2014

(30) Foreign Application Priority Data
Jul. 19, 2012 (JP) .................. 2012-160977

(51) Int. Cl.
- B63H 23/34 (2006.01)
- F16F 7/10 (2006.01)
- B63H 21/30 (2006.01)
- B63H 21/34 (2006.01)
- B63H 1/15 (2006.01)
- F16F 15/126 (2006.01)

(52) U.S. Cl.
CPC .. *F16F 7/10* (2013.01); *B63H 1/15* (2013.01); *B63H 21/305* (2013.01); *B63H 21/34* (2013.01); *F16F 15/126* (2013.01); *B63H 2023/342* (2013.01); *Y10T 74/2121* (2015.01)

(58) Field of Classification Search
None
See application file for complete search history.

(56) References Cited

U.S. PATENT DOCUMENTS 3,656,785 A * 4/1972 Lothar .................. F16D 1/094
  403/370
5,593,280 A   1/1997 Takada et al.
(Continued)

FOREIGN PATENT DOCUMENTS

CN   201284009 Y   8/2009
CN   202541815 U   11/2012
(Continued)

*Primary Examiner* — Ninh H Nguyen
*Assistant Examiner* — Justin Seabe
(74) *Attorney, Agent, or Firm* — Keating and Bennett, LLP

(57) ABSTRACT

A damper unit includes a first damper arranged to transmit a torque around a rotation axis transmitted from an input member side to an output member side, an intermediate member arranged to transmit a torque around the rotation axis transmitted from the first damper to the output member side, and a second damper arranged to transmit a torque around the rotation axis transmitted from the intermediate member to the output member side, wherein at least a portion of the second damper is disposed on a straight line that passes through the first damper and is parallel or substantially parallel to the rotation axis.

14 Claims, 13 Drawing Sheets

(56) References Cited

U.S. PATENT DOCUMENTS

| | | | |
|---|---|---|---|
| 5,888,108 A | 3/1999 | Iriono | |
| 6,322,407 B1 | 11/2001 | Onoue | |
| 6,478,543 B1 * | 11/2002 | Tuchscherer | B63H 23/34 416/134 R |
| 7,008,188 B2 * | 3/2006 | Booe, Jr. | B63H 1/15 416/134 R |
| 7,086,836 B1 * | 8/2006 | Sheth | B63H 23/34 416/134 R |
| 7,637,792 B1 * | 12/2009 | Davis | B63H 23/34 416/134 R |
| 8,277,269 B1 * | 10/2012 | Alby | B63H 23/34 416/2 |
| 2007/0053777 A1 | 3/2007 | Harada | |
| 2009/0001244 A1 | 1/2009 | Lucier et al. | |
| 2010/0130078 A1 | 5/2010 | Okabe | |
| 2011/0212657 A1 | 9/2011 | Tsunekawa et al. | |

FOREIGN PATENT DOCUMENTS

| | | |
|---|---|---|
| JP | 09-263294 A | 10/1997 |
| JP | 2000-280983 A | 10/2000 |
| JP | 2007-069738 A | 3/2007 |
| JP | 2010-121750 A | 6/2010 |
| JP | 2011-178228 A | 9/2011 |
| TW | 299294 B | 3/1997 |

* cited by examiner

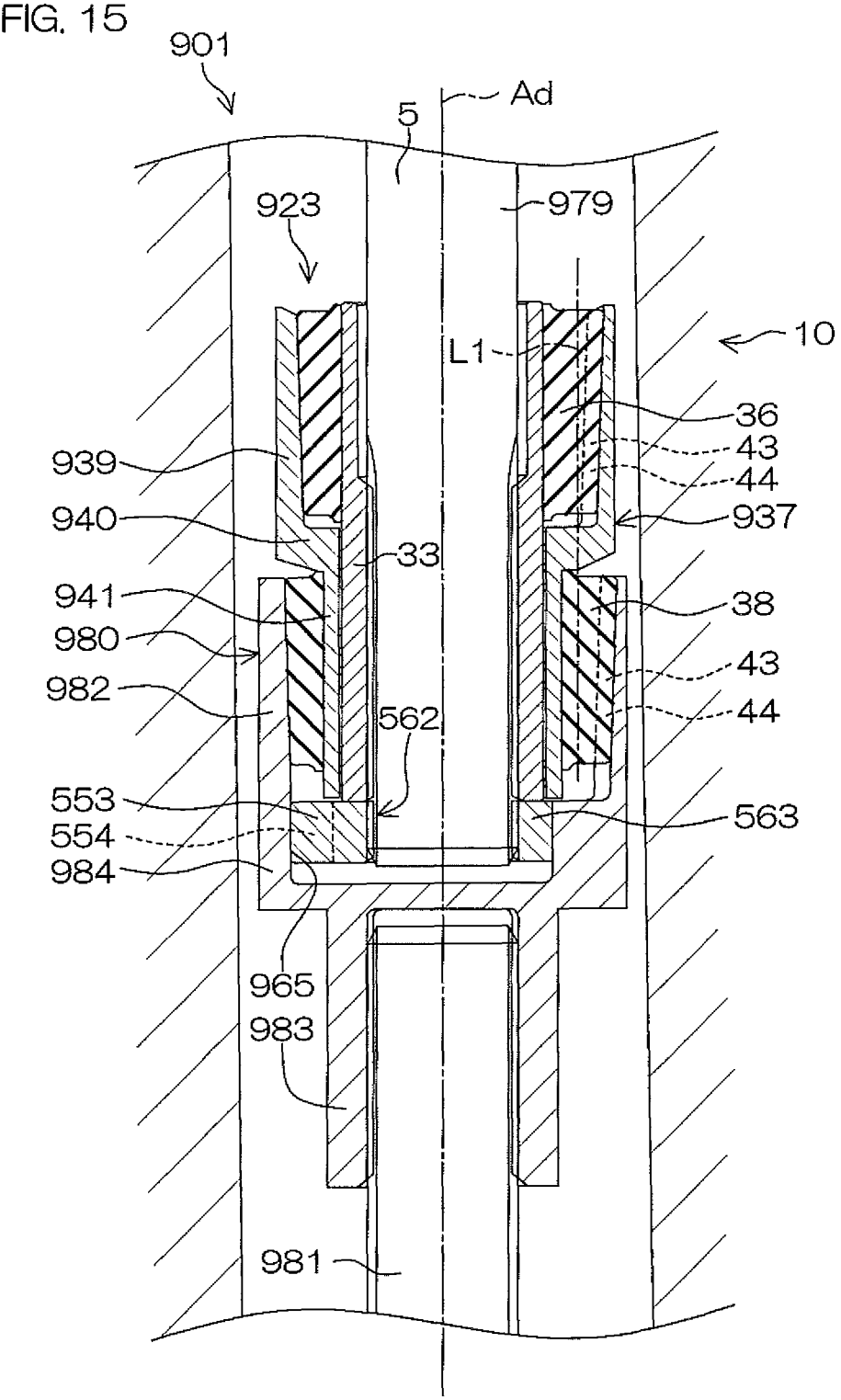

DAMPER UNIT FOR VESSEL PROPULSION APPARATUS, PROPELLER FOR VESSEL PROPULSION APPARATUS, AND VESSEL PROPULSION APPARATUS

BACKGROUND OF THE INVENTION

1. Field of the Invention

The present invention relates to a damper unit for a vessel propulsion apparatus, a propeller for a vessel propulsion apparatus including the damper unit, and a vessel propulsion apparatus including the damper unit.

2. Description of the Related Art

A propeller for a vessel propulsion apparatus is mounted on a propeller shaft via a propeller damper (damper unit). The damper unit transmits a torque between the propeller and the propeller shaft and absorbs a vibration between the propeller and the propeller shaft. An impact (shift shock) accompanying engagement/disengagement of a dog clutch and an impact accompanying collision of the propeller and an underwater obstacle are absorbed by the damper unit. The damper unit thus contributes to the protection of parts, reduction of impact noise, and improvement of maneuverability.

A damper unit according to U.S. Patent Application Publication No. 2011/0212657 A1 includes two dampers (a main damper and a sub damper) disposed in parallel. In a case in which a torque applied to the propeller or the propeller shaft is small, only the main damper, which is softer than the sub damper, transmits the torque. When the torque applied to the propeller or the propeller shaft increases, the torque is transmitted by two parallel paths (a path via the main damper and a path via the sub damper). That is, when the torque applied to the propeller or the propeller shaft increases, both dampers transmit the torque.

SUMMARY OF THE INVENTION

A performance of the damper unit is defined by a maximum operating angle and a maximum torque. The operating angle is an elastic deformation amount of the damper unit in a circumferential direction (in the case of a propeller damper, a relative rotation angle of the propeller and the propeller shaft). The maximum operating angle is a maximum value of the operating angle at which the damper unit does not break, undergo plastic deformation, or slip with respect to the propeller and the propeller shaft. The maximum torque is a magnitude of the torque transmitted to the damper unit in state in which the damper unit is twisted at the maximum operating angle. The greater both the maximum operating angle and the maximum torque, the higher the performance of the damper unit.

With the damper unit according to U.S. Patent Application Publication No. 2011/0212657 A1, when the sub damper becomes coupled to both the propeller and the propeller shaft when the torque applied to the propeller, etc., becomes large, the main damper is coupled to both the propeller and the propeller shaft regardless of the magnitude of the torque. The maximum operating angle of the damper unit as a whole is thus restricted by the main damper and it is difficult to significantly improve the performance of the damper unit.

A preferred embodiment of the present invention thus provides a damper unit for a vessel propulsion apparatus that transmits a torque between an input member and an output member, which are disposed on a transmission path in which a rotation of a prime mover is transmitted to a plurality of blades, and that absorbs a vibration between the input member and the output member. The damper unit includes a first damper arranged to transmit a torque around a rotation axis, transmitted from an input member side, to an output member side, an intermediate member arranged to transmit a torque around the rotation axis, transmitted from the first damper, to the output member side, and a second damper arranged to transmit the torque around the rotation axis, transmitted from the intermediate member, to the output member side wherein at least a portion of the second damper is disposed on a straight line that passes through the first damper and is parallel or substantially parallel to the rotation axis.

With this arrangement of the present preferred embodiment of the present invention, the first damper and the second damper are disposed in series on the transmission path transmitting the rotation of the prime mover to the plurality of blades. The torque around the rotation axis transmitted to the input member is transmitted to the output member via the first damper, the intermediate member, and the second damper, in that order. Oppositely, a torque around the rotation axis transmitted to the output member is transmitted to the input member via the second damper, the intermediate member, and the first damper, in that order.

The first damper and the second damper are disposed in series and, therefore, torques of substantially equal magnitudes are applied to the first damper and the second damper, and the first damper and the second damper deform elastically in a circumferential direction (direction around the rotation axis). A maximum operating angle of the damper unit (maximum elastic deformation amount of the damper unit around the rotation axis) is a sum of a maximum operating angle of the first damper and a maximum operating angle of the second damper. The maximum operating angle of the damper unit can thus be increased while maintaining a maximum torque (torque corresponding to the maximum operating angle) at not less than a fixed value.

Further, at least a portion of the second damper is disposed on the straight line passing through the first damper and is parallel or substantially parallel to the rotation axis and therefore, at least a portion of the second damper and the first damper are aligned in an axial direction (direction along the rotation axis). The damper unit can thus be made smaller in outer diameter than in a case in which the first damper and the second damper are disposed concentrically. Therefore, in a case in which the prime mover is an internal combustion engine and the damper unit is disposed in an interior of a propeller that defines an exhaust passage, any reduction of an area of the exhaust passage can be minimized. Lowering of an output of the vessel propulsion apparatus can thus be minimized.

In a preferred embodiment of the present invention, the damper unit may further include a main stopper arranged to restrict a relative rotation of the input member and the output member to cause the input member and the output member to rotate integrally when the torque around the rotation axis transmitted to the damper unit exceeds a predetermined value.

With this arrangement of the present preferred embodiment of the present invention, when the torque is applied to the damper unit, the first damper and the second damper twist elastically in the circumferential direction (direction around the rotation axis) and the input member and the output member undergo relative rotation. When the torque applied to the damper unit exceeds the predetermined value, the input member and the output member are coupled together by the main stopper and the relative rotation of the input member and the output member is restricted by the main stopper. The input member and the output member thus rotate integrally. The elastic deformations of the first damper and the second damper are thus restricted by the main stopper and twist amounts of the first damper and the second damper are limited. An operating angle of the damper unit can thus be prevented from exceeding the maximum operating angle.

In a preferred embodiment of the present invention, the damper unit may further include a sub stopper arranged to restrict a relative rotation of one of either the input member or the output member with respect to the intermediate member to cause one of either the input member or the output member to rotate integrally with the intermediate member when the torque around the rotation axis transmitted to the damper unit exceeds a predetermined value.

With this arrangement of the present preferred embodiment of the present invention, when the torque applied to the damper unit exceeds the predetermined value, the relative rotation of one of either the input member or the output member with respect to the intermediate member is restricted by the sub stopper and one of either the input member or the output member rotates integrally with the intermediate member. The elastic deformations of the first damper and the second damper are thus restricted by the sub stopper and the twist amounts of the first damper and the second damper are limited. That is, the twist amounts of the first damper and the second damper are restricted by the two stoppers (the main stopper and the sub stopper) and the operating angle of the damper unit can thus be reliably prevented from exceeding the maximum operating angle.

In a preferred embodiment of the present invention, the first damper, the intermediate member, and the second damper may be housed together in a housing. The housing is preferably an integral member. In this case, it suffices that at least a portion of the first damper is housed inside the housing. The same applies to the intermediate member and the second damper.

In a preferred embodiment of the present invention, one of either of the first damper and the second damper may be surrounded by the intermediate member and the other of the first damper and the second damper may surround the intermediate member. Also, each of the first damper and the second damper may surround the intermediate member. Also, each of the first damper and the second damper may be surrounded by the intermediate member.

In a case in which one of either of the first damper and the second damper is surrounded by the intermediate member and the other of the first damper and the second damper surrounds the intermediate member, the intermediate member may include an upstream cylindrical portion coupled to the first damper and surrounding the first damper, and a downstream cylindrical portion coupled to the second damper and surrounded by the second damper and having a smaller outer diameter than the upstream cylindrical portion. Also, the intermediate member may include, in addition to the upstream cylindrical portion and the downstream cylindrical portion, a cylindrical step portion extending from the upstream cylindrical portion to the downstream cylindrical portion and defining a step interposed between the first damper and the second damper.

With this arrangement of the present preferred embodiment of the present invention, the first damper is surrounded by the upstream cylindrical portion of the intermediate member and the second damper surrounds the downstream cylindrical portion of the intermediate member. The outer diameter of the downstream cylindrical portion is smaller than an outer diameter and an inner diameter of the upstream cylindrical portion. In a case in which a thickness of the second damper is fixed, when the outer diameter of the downstream cylindrical portion increases, an outer diameter of the second damper also increases accordingly. Therefore, by making the outer diameter of the downstream cylindrical portion smaller than the upstream cylindrical portion, the outer diameter of the second damper can be made small. Enlargement of the damper unit can thus be minimized.

Another preferred embodiment of the present invention provides a propeller for a vessel propulsion apparatus including the damper unit and a propeller member. The propeller member includes an inner cylinder as the output member surrounding the damper unit, an outer cylinder as a housing surrounding the damper unit and the inner cylinder, and a plurality of blades extending outward from the outer cylinder.

With this arrangement of the present preferred embodiment of the present invention, the propeller member that generates a thrust by the plurality of blades is mounted on a propeller shaft via the damper unit. An impact (shift shock) accompanying engagement/disengagement of a dog clutch and an impact accompanying collision of the propeller and an underwater obstacle are absorbed by the damper unit. As mentioned above, the damper unit can increase the maximum operating angle while maintaining the maximum torque at not less than a fixed value. The propeller can thus transmit a greater torque between the propeller member and the propeller shaft by the damper unit. Further, the propeller can caused the impacts applied to the propeller member and the propeller shaft to be reliably absorbed by the damper unit.

In another preferred embodiment of the present invention, the propeller may further include a front member mounted on a propeller shaft, which is rotatable around the rotation axis, and supporting a front end portion of the inner cylinder and a rear member mounted on the propeller shaft and supporting a rear end portion of the inner cylinder.

With this arrangement of the present preferred embodiment of the present invention, the front member and the rear member are mounted on the propeller shaft. The front end portion of the inner cylinder of the propeller member is supported by the propeller shaft via the front member and the rear end portion of the inner cylinder of the propeller member is supported by the propeller shaft via the rear member. That is, the opposite end portions of the inner cylinder are supported by the propeller shaft via the front member and the rear member. An attitude of the inner cylinder can thus be stabilized better than in a case in which just an end portion at one side of the inner cylinder is supported. The propeller member can thus be rotated with stability.

In another preferred embodiment of the present invention, the front member may include a front pressed portion that is pressed forward by the inner cylinder and the rear member may include a rear pressed portion that is pressed rearward by the inner cylinder.

With this arrangement of the present preferred embodiment of the present invention, when the propeller member generates a thrust in a forward drive direction, the front pressed portion of the front member is pressed forward by the inner cylinder and the thrust in the forward drive direction is transmitted from the inner cylinder to the propeller shaft via the front member. Oppositely, when the propeller member generates a thrust in a reverse drive direction, the rear pressed portion of the rear member is pressed rearward by the inner cylinder and the thrust in the reverse drive direction is transmitted from the inner cylinder to the propeller shaft via the rear member. As a result, thrusts are transmitted to a hull and the hull is propelled.

In another preferred embodiment of the present invention, the inner cylinder may entirely house the first damper, the intermediate member, and the second damper.

Yet another preferred embodiment of the present invention provides a vessel propulsion apparatus including a prime mover, a driveshaft rotatable around a drive axis, extending in an up/down direction, and to which a rotation from the prime mover is transmitted, a propeller shaft rotatable around a propeller axis, the propeller axis intersecting the drive axis, and to which a rotation from the driveshaft is transmitted, a propeller member rotatable around the propeller axis and to which a rotation from the propeller shaft is transmitted, and the damper unit disposed on a transmission path in which the rotation of the prime mover is transmitted to the propeller member via the driveshaft and the propeller shaft.

With this arrangement of the present preferred embodiment of the present invention, the rotation of the prime mover is transmitted to the propeller member via the driveshaft and the propeller shaft, in that order. The damper unit is disposed on the transmission path transmitting the rotation of the prime mover to the propeller member via the driveshaft and the propeller shaft. A torque of the prime mover is thus transmitted to the propeller member via the damper unit, the driveshaft, and the propeller shaft. Further, an impact generated in the transmission path is absorbed by the damper unit.

In the yet another preferred embodiment of the present invention, the damper unit may be disposed on the propeller axis. In this case, the damper unit may be housed inside the propeller member or may be housed inside a casing that houses the driveshaft and the propeller shaft.

In another preferred embodiment of the present invention, the damper unit may be disposed on the drive axis. In this case, the damper unit may be housed inside a casing that houses the driveshaft and the propeller shaft.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15 is a sectional view of a portion of a vessel propulsion apparatus according to a ninth preferred embodiment of the present invention.

DETAILED DESCRIPTION OF THE PREFERRED EMBODIMENTS

Figure 1:
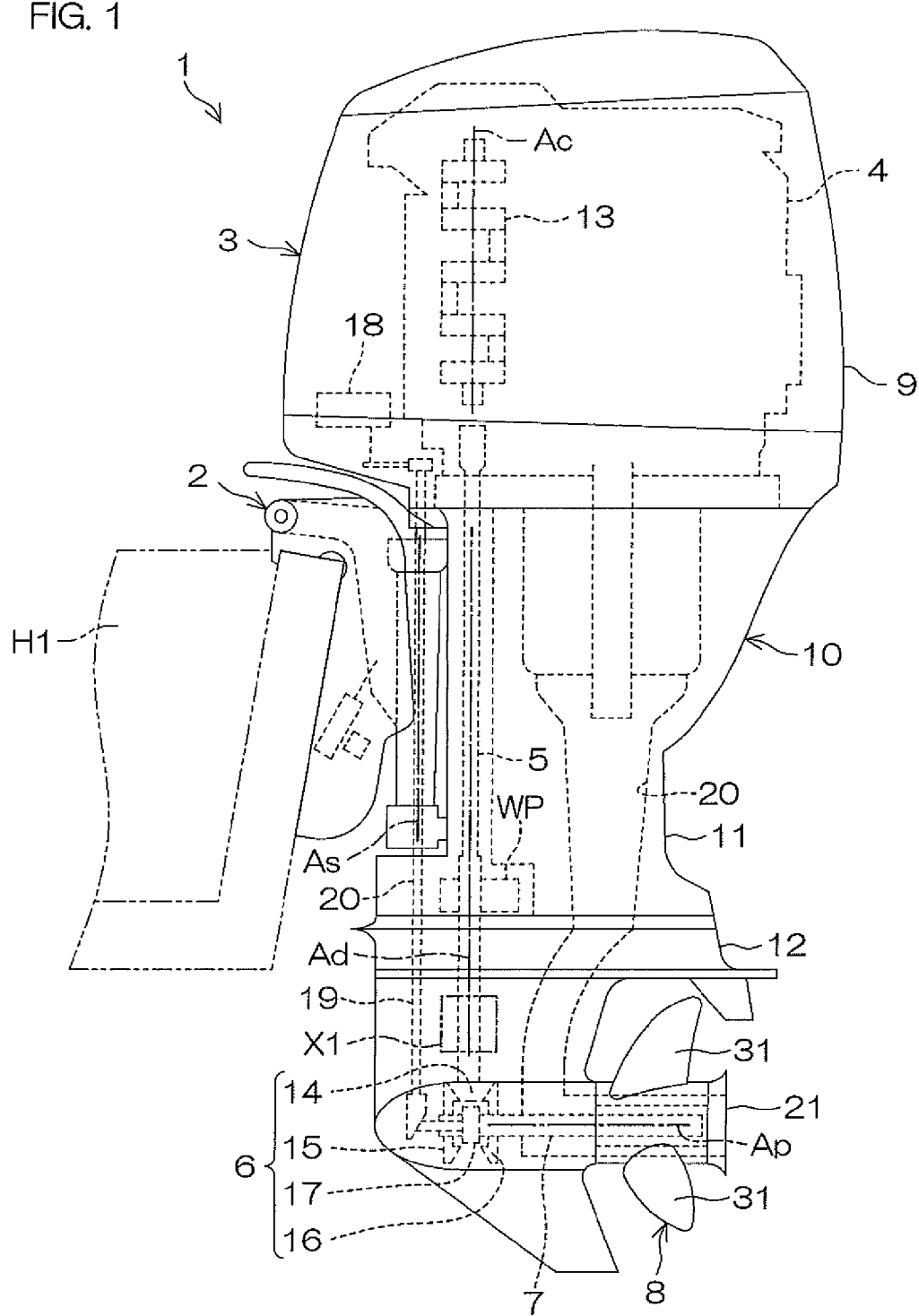
FIG. 1 is a side view of a vessel propulsion apparatus according to a first preferred embodiment of the present invention.

FIG. 1 is a side view of a vessel propulsion apparatus 1 according to a first preferred embodiment of the present invention.

The vessel propulsion apparatus 1 includes a bracket 2 mountable on a rear portion of a hull H1 and an outboard motor 3 supported by the bracket 2 in a manner enabling rotation around a steering axis extending in an up/down direction.

The outboard motor 3 includes an engine 4 generating a motive power, a driveshaft 5 connected to the engine 4, a forward/reverse drive switching mechanism 6 connected to the driveshaft 5, a propeller shaft 7 connected to the forward/reverse drive switching mechanism 6, and a propeller 8 connected to the propeller shaft 7. Further, the outboard motor 3 includes an engine cover 9 housing the engine 4 and a casing 10 housing the driveshaft 5, etc. The casing 10 includes an upper case 11 disposed below the engine cover 9 and a lower case 12 disposed below the upper case 11.

The engine 4 is an internal combustion engine that includes a crankshaft 13 rotatable around a crank axis Ac extending in the up/down direction. The engine 4 is an example of a prime mover. The prime mover is not restricted to the engine 4 and may be an electric motor or may be the engine 4 and an electric motor. The driveshaft 5, the forward/reverse drive switching mechanism. 6, and the propeller shaft 7 are disposed on a transmission path transmitting a rotation of the engine 4 (rotation of the crankshaft 13) to a plurality of blades 31 of the propeller 8. The rotation of the engine 4 is transmitted to the propeller 8 via the driveshaft 5, the forward/reverse drive switching mechanism 6, and the propeller shaft 7, in that order. A thrust that propels the hull H1 is thus generated.

The driveshaft 5 extends downward from the engine 4. The driveshaft 5 extends in the up/down direction inside the upper case 11 and the lower case 12. The driveshaft 5 is rotatable around a drive axis Ad (central axis of the driveshaft 5) with respect to the casing 10. An impeller of a water pump WP that feeds water outside the outboard motor 3 to the engine 4 rotates around the drive axis Ad together with the driveshaft 5. An upper end portion of the driveshaft 5 is connected to the engine 4 and a lower end portion of the driveshaft 5 is connected to the forward/reverse drive switching mechanism 6. The driveshaft 5 includes a plurality of shafts disposed on the drive axis Ad.

The propeller shaft 7 extends rearward from the forward/reverse drive switching mechanism 6. The propeller shaft 7 extends in a front/rear direction inside the lower case 12. The propeller shaft 7 is rotatable around a propeller axis Ap (central axis of the propeller shaft 7) with respect to the casing 10. A rear end portion of the propeller shaft 7 projects rearward from the lower case 12. The propeller 8 is coupled to the rear end portion of the propeller shaft 7. The propeller 8 rotates around the propeller axis Ap together with the propeller shaft 7.

The forward/reverse drive switching mechanism 6 as a speed reduction mechanism includes a pinion 14 rotating around the drive axis Ad together with the driveshaft 5, a front gear 15 and a rear gear 16 engaged with the pinion 14, and a cylindrical dog clutch 17 engaged selectively with one of either of the front gear 15 and the rear gear 16. The outboard motor 3 includes a shift actuator 18 disposed inside the engine cover 9 and a shift rod 19 connecting the shift actuator 18 and the dog clutch 17. The forward/reverse drive switching mechanism 6 is selectively switched to one state among a forward drive state, a reverse drive state, and a neutral state.

The pinion 14, the front gear 15, and the rear gear 16 are bevel gears. The pinion 14 is coupled in a downward facing attitude to the lower end portion of the driveshaft 5, and the front gear 15 and the rear gear 15 are held in the lower case 12. The front gear 15 is engaged with the pinion 14 at a front of the drive axis Ad and the rear gear 16 is engaged with the pinion 14 at a rear of the drive axis Ad. The front gear 15 and the rear gear 16 are disposed at an interval in the front/rear direction. The dog clutch 17 is disposed between the front gear 15 and the rear gear 16. The propeller shaft 7 penetrates through the front gear 15, the rear gear 16, and the dog clutch 17, disposed on the propeller axis Ap, in the front/rear direction. The front gear 15 and the rear gear 16 are rotatable around the propeller axis Ap with respect to the casing 10 and the propeller shaft 7.

An inner circumferential portion of the dog clutch 17 is spline-coupled with an outer circumferential portion of the propeller shaft 7. The dog clutch 17 is thus movable in the front/rear direction with respect to the propeller shaft 7 and rotates around the propeller axis Ap together with the propeller shaft 7. The dog clutch 17 is movable with respect to the propeller shaft 7 between a forward drive position at which a front end portion of the dog clutch 17 engages with the front gear 15 and a reverse drive position at which a rear end portion of the dog clutch 17 engages with the rear gear 16. A position between the front drive position and the reverse drive position (position shown in FIG. 1) is a neutral position at which the dog clutch 17 is separated from both the front gear 15 and the rear gear 16. The shift actuator 18 moves the dog clutch 17 to a shift position among the forward drive position, the reverse drive position, and the neutral position.

The driveshaft 5 is driven in a fixed rotation direction by the engine 4. The pinion 14 rotates around the drive axis Ad together with the driveshaft 5. The front gear 15 and the rear gear 16 rotate in mutually opposite directions in accompaniment with the rotation of the pinion 14. In a state in which the dog clutch 17 is disposed at the forward drive position and the front gear 15 is rotating, the rotation of the front gear 15 is transmitted to the propeller shaft 7 via the dog clutch 17. The propeller shaft 7 and the propeller 8 are thus rotated in a forward rotation direction (for example, clockwise as viewed from the rear of the propeller 8) and a thrust that drives hull H1 forward is generated. On the other hand, in a state in which the dog clutch 17 is disposed at the reverse drive position and the rear gear 16 is rotating, the rotation of the rear gear 16 is transmitted to the propeller shaft 7 via the dog clutch 17. The propeller shaft 7 and the propeller 8 are thus rotated in a reverse rotation direction (a direction opposite to the forward rotation direction) and a thrust that drives hull H1 in reverse is generated. Also, in a state in which the dog clutch 17 is disposed at the neutral position, the rotation of the driveshaft 5 is not transmitted to the propeller shaft 7 and the driveshaft 5 idles.

The outboard motor 3 includes an exhaust passage 20 by which an exhaust, generated at the engine 4, is exhausted underwater from the propeller 8. The exhaust passage 20 is connected to the engine 4. The exhaust passage 20 extends downward from the engine 4 to the propeller shaft 7 and extends farther in the front/rear direction along the propeller shaft 7. The exhaust passage 20 includes an exhaust outlet 21 that opens rearward at the propeller 8. In a state in which the propeller 8 is disposed underwater, the exhaust outlet 21 is also disposed underwater. Therefore, in this state, the exhaust outlet 21 is blocked by water. The exhaust generated at the engine 4 flows into the exhaust passage 20 from an upstream end of the exhaust passage 20. When an exhaust pressure inside the exhaust passage 20 increases, the water inside the exhaust outlet 21 is forced outside the propeller 8 by the exhaust and the exhaust inside the exhaust passage 20 is discharged underwater from the propeller 8.

Figure 2:
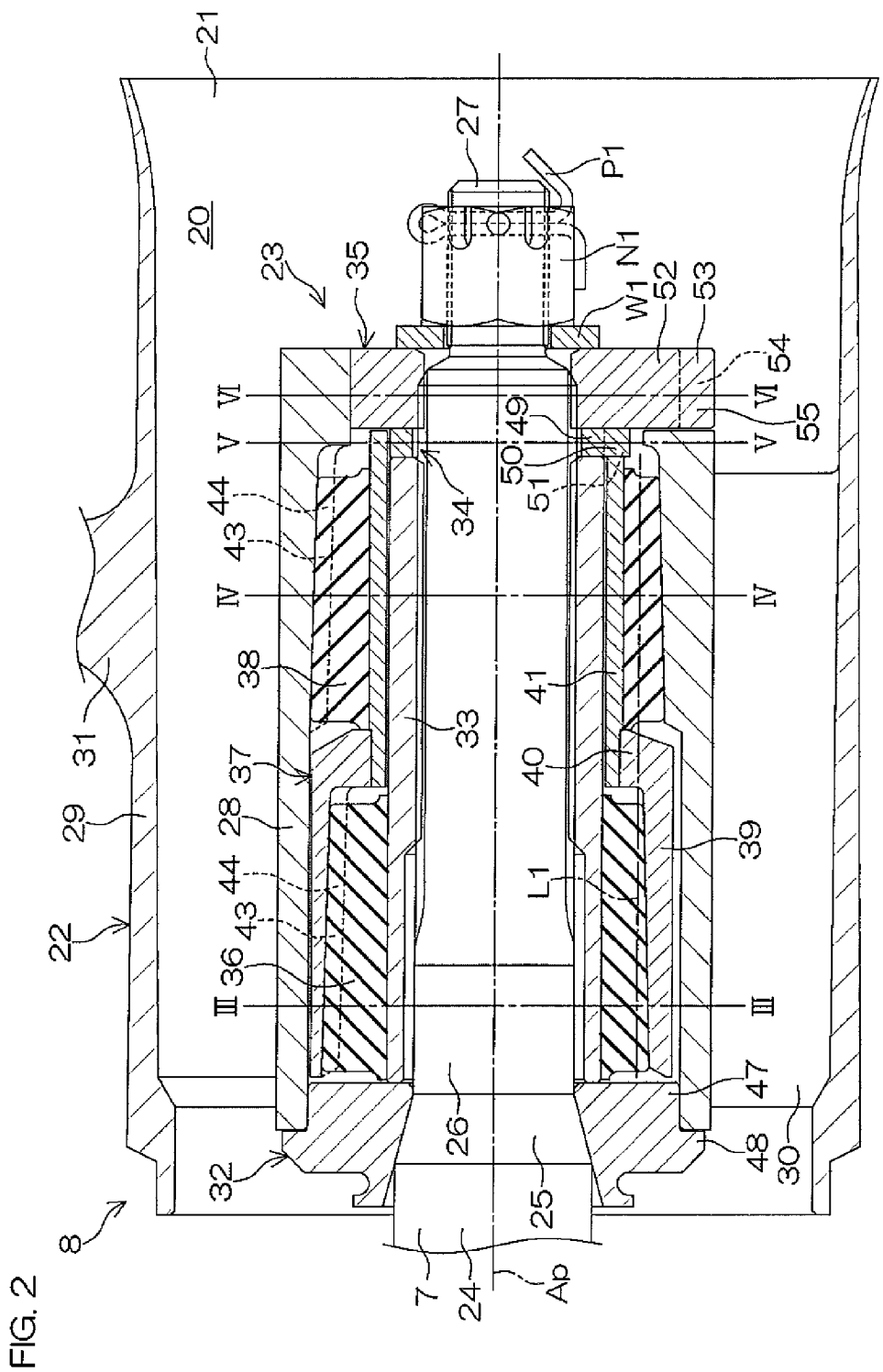
FIG. 2 is a sectional view of a propeller shaft and a propeller.
Figure 3:
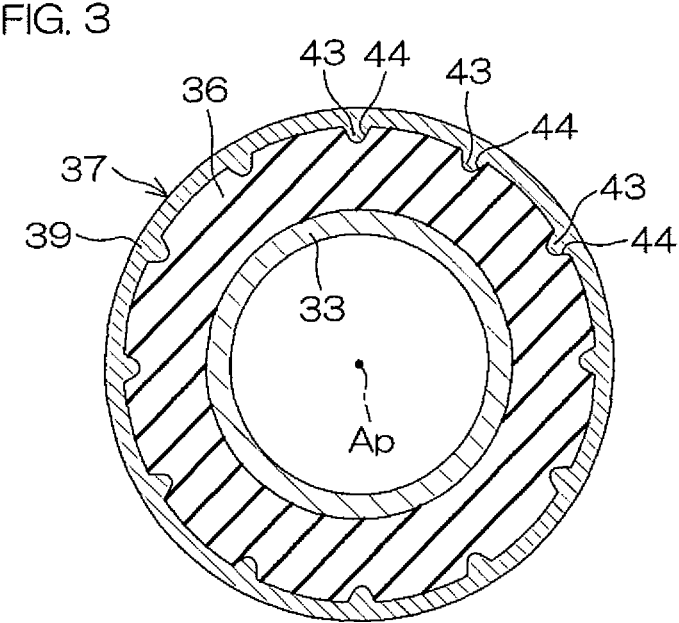
FIG. 3 is a sectional view taken along line in FIG. 2.
Figure 4:
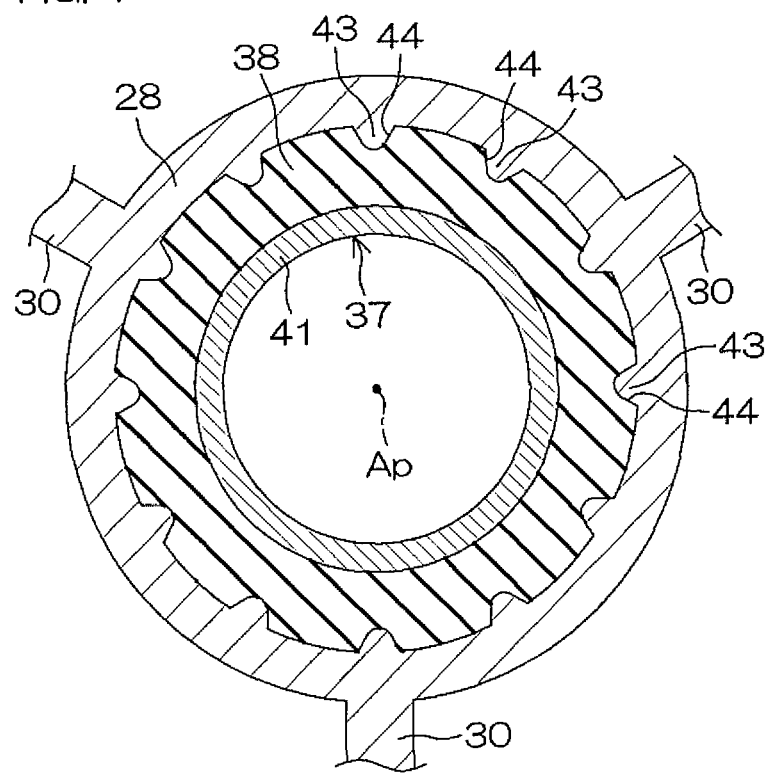
FIG. 4 is a sectional view taken along line IV-IV in FIG. 2.
Figure 5:
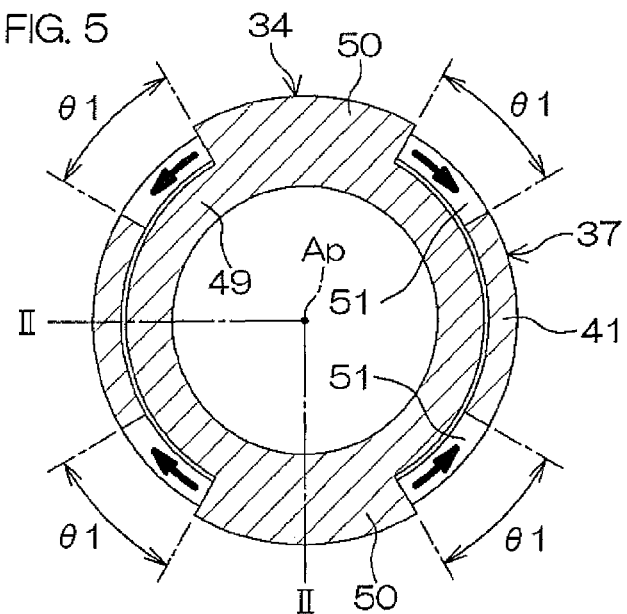
FIG. 5 is a sectional view taken along line V-V in FIG. 2.
Figure 6:
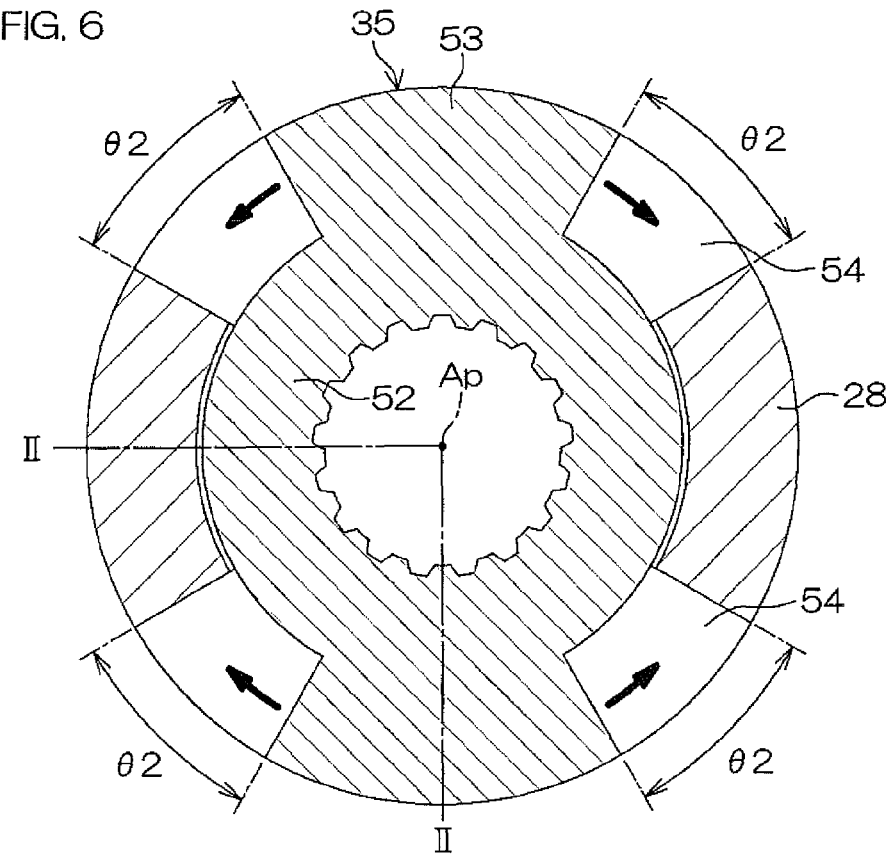
FIG. 6 is a sectional view taken along line VI-VI in FIG. 2.

FIG. 2 is a sectional view of the propeller shaft 7 and the propeller 8. FIG. 3 is a sectional view taken along line III-III in FIG. 2, and FIG. 4 is a sectional view taken along line IV-IV in FIG. 2. FIG. 5 is a sectional view taken along line V-V in FIG. 2, and FIG. 6 is a sectional view taken along line VI-VI in FIG. 2. A section at an upper side of the propeller axis Ap in FIG. 2 and a section at a lower side of the propeller axis Ap in FIG. 2 are mutually orthogonal or substantially orthogonal sections (see line II-II shown in FIG. 5 and FIG. 6). A free state in which a torque is not applied to a damper unit 23 is illustrated in FIG. 2 to FIG. 6. In the following, the damper unit 23 in the free state shall be described unless noted otherwise.

As shown in FIG. 2, the propeller 8 includes a cylindrical propeller member 22 that generates a thrust and the cylindrical damper unit 23 that is detachably mounted on the propeller member 22. The outboard motor 3 includes a washer W1 and a nut N1 that fix the propeller member 22 and the damper unit 23 to the rear end portion of the propeller shaft 7 and a pin P1 that prevents loosening of the nut N1.

As shown in FIG. 2, the propeller 8 is detachably mounted on the rear end portion of the propeller shaft 7. The rear end portion of the propeller shaft 7 includes a large diameter portion 24, a tapered portion 25, a small diameter portion 26, and a bolt portion 27 that are columnar and extend in the front/rear direction along the propeller axis Ap. The large diameter portion 24, the tapered portion 25, the small diameter portion 26, and the bolt portion 27 are aligned in that order in the front/rear direction from the front. The large diameter portion 24 is thicker than the small diameter portion 26 and the small diameter portion 26 is thicker than the bolt portion 27. The tapered portion 25 extends from a rear end of the large diameter portion 24 to a front end of the small diameter portion 26 such that the tapered portion 25 is tapered toward the small diameter portion 26.

As shown in FIG. 2, the propeller member 22 includes an inner cylinder 28 surrounding the damper unit 23 around the propeller axis Ap, and an outer cylinder 29 coaxially surrounding the inner cylinder 28 and spaced from the inner cylinder 28 in a radial direction (direction orthogonal or substantially orthogonal to the propeller axis Ap). Further, the propeller member 22 includes a plurality of ribs 30 coupling the inner cylinder 28 and the outer cylinder 29 at a plurality of positions separated in a circumferential direction (direction around the propeller axis Ap) and the plurality of blades 31 extending outward from the outer cylinder 29. The damper unit 23 is disposed on the transmission path that transmits the rotation of the engine 4 to the plurality of blades 31. The damper unit 23 transmits a torque around the propeller axis Ap between the propeller shaft 7 as an input member and the inner cylinder 28 as an output member and absorbs a vibration around the propeller axis Ap between the propeller shaft 7 and the inner cylinder 28.

As shown in FIG. 2, the inner cylinder 28 of the propeller member 22 is housed inside the outer cylinder 29 of the propeller member 22. A front end of the inner cylinder 28 is disposed at a position more rearward than a front end of the outer cylinder 29 and a rear end of the inner cylinder 28 is disposed at a position more forward than a rear end of the outer cylinder 29. The plurality of ribs 30 are disposed between the inner cylinder 28 and the outer cylinder 29 at intervals in the circumferential direction (see FIG. 4). Each rib 30 has a plate-shaped configuration extending radially from an outer circumferential surface of the inner cylinder 28 to an inner circumferential surface of the outer cylinder 29. The plurality of blades 31 are disposed on a circumference of the outer cylinder 29. The plurality of blades 31 are disposed at intervals in the circumferential direction. The inner cylinder 28, the outer cylinder 29, the ribs 30, and the blades 31 may be a single integral member or may include a plurality of members integrally coupled. In either case, the inner cylinder 28, the outer cylinder 29, the ribs 30, and the blades 31 rotate integrally around the propeller axis Ap. The plurality of blades 31 generate the thrust by rotating around the propeller axis Ap.

As shown in FIG. 2, the outer circumferential surface of the inner cylinder 28 and the inner circumferential surface of the outer cylinder 29 face each other at the radial interval. The plurality of ribs 30 are disposed at the intervals in the circumferential direction between the inner cylinder 28 and the outer cylinder 29. The outer circumferential surface of the inner cylinder 28, the inner circumferential surface of the outer cylinder 29, and the plurality of ribs 30 define a portion of the exhaust passage 20 by which the exhaust generated at the engine 4 is discharged from the propeller 8. Further, a rear end portion of the outer cylinder 29 defines the exhaust outlet 21 that is opened rearward. The exhaust generated at the engine 4 passes through an interior of the casing 10 and is guided into an interior of the propeller member 22 from a front of the propeller member 22. The exhaust guided into the propeller member 22 from the casing 10 flows rearward through a cylindrical space between the inner cylinder 28 and the outer cylinder 29 and is discharged rearward from the rear end portion of the outer cylinder 29. The exhaust generated at the engine 4 is thus discharged underwater from the propeller 8.

As shown in FIG. 2, the damper unit 23 is disposed on the propeller axis Ap. The damper unit 23 includes a front spacer 32, a sleeve 33, an intermediate spacer 34, and a rear spacer 35 that are cylindrical and are mounted on the propeller shaft 7. Further, the damper unit 23 includes a cylindrical first damper 36 arranged to transmit the torque from the sleeve 33 to a downstream side (downstream side of the transmission path), a cylindrical intermediate member 37 arranged to transmit the torque from the first damper 36 to the downstream side, and a second damper 38 arranged to transmit the torque from the intermediate member 37 to the propeller member 22.

As shown in FIG. 2, the front spacer 32, the sleeve 33, the intermediate spacer 34, and the rear spacer 35 surround the propeller shaft 7 around the propeller axis Ap. The front spacer 32, the sleeve 33, the intermediate spacer 34, and the rear spacer 35 are aligned in the front/rear direction in that order from the front. The sleeve 33 and the intermediate spacer 34 are disposed inside the inner cylinder 28. The sleeve 33 is longer in the front/rear direction than the front spacer 32, the intermediate spacer 34, and the rear spacer 35. Further, an outer diameter of the sleeve 33 is smaller than outer diameters of the front spacer 32 and the rear spacer 35. Similarly, an outer diameter of the intermediate spacer 34 is smaller than outer diameters of the front spacer 32 and the rear spacer 35.

As shown in FIG. 2, the sleeve 33 extends in the front/rear direction along the propeller axis Ap. A front end of the sleeve 33 is disposed farther to the rear than the front end of the inner cylinder 28 and a rear end of the sleeve 33 is disposed farther to the front than the rear end of the inner cylinder 28. The sleeve 33 surrounds the small diameter portion 26 of the propeller shaft 7 around the propeller axis Ap. An inner circumferential portion of the sleeve 33 is spline-connected to an outer circumferential portion of the small diameter portion 26. The sleeve 33 is thus movable in the axial direction (direction along the propeller axis Ap) with respect to the propeller shaft 7 and rotates together with the propeller shaft 7 around the propeller axis Ap. The torque transmitted to the propeller shaft 7 is transmitted to the sleeve 33 via male splines provided on the outer circumferential portion of the propeller shaft 7 and female splines provided on the inner circumferential portion of the sleeve 33.

As shown in FIG. 2, the front spacer 32 is mounted on a front end portion of the inner cylinder 28. An opening defined by the front end portion of the inner cylinder 28 is closed by the propeller shaft 7 and the front spacer 32. Also, the rear spacer 35 is mounted on a rear end portion of the inner cylinder 28. An opening defined by the rear end portion of the inner cylinder 28 is closed by the propeller shaft 7 and the rear spacer 35. The front end portion of the inner cylinder 28 is supported by the front spacer 32 and the rear end portion of the inner cylinder 28 is supported by the rear spacer 35. The front end portion and the rear end portion of the inner cylinder 28 are thus supported by the propeller shaft 7 via the front spacer 32 and the rear spacer 35.

As shown in FIG. 2, the washer W1 is disposed behind the rear spacer 35. The nut N1 is disposed behind the washer W1. Outer diameters of the washer W1 and the nut N1 are smaller than outer diameters of the inner cylinder 28 and the rear spacer 35. The washer W1 and the nut N1 are mounted on the bolt portion 27 of the propeller shaft 7. The front spacer 32, the sleeve 33, the intermediate spacer 34, and the rear spacer 35 are pressed forward by the washer W1 and the nut N1. Forward movement of the front spacer 32 with respect to the propeller shaft 7 is restricted by contact of an outer circumferential surface of the propeller shaft 7 and an inner circumferential surface of the front spacer 32. The front spacer 32, the sleeve 33, the intermediate spacer 34, and the rear spacer 35 are thus fixed to the propeller shaft 7 by the washer W1 and the nut N1 and rotate around the propeller axis Ap together with the propeller shaft 7.

As shown in FIG. 2, the first damper 36, the intermediate member 37, and the second damper 38 are disposed inside the inner cylinder 28. The inner cylinder 28 entirely houses the first damper 36, the intermediate member 37, and the second damper 38. The first damper 36, the intermediate member 37, and the second damper 38 are thus housed inside the outer cylinder 29 as a housing. The first damper 36, the intermediate member 37, and the second damper 38 are disposed between the sleeve 33 and the inner cylinder 28. The first damper 36, the intermediate member 37, and the second damper 38 surround the sleeve 33 around the propeller axis Ap. The first damper 36 is disposed in front of the second damper 38. The first damper 36 is surrounded by the intermediate member 37 and the second damper 38 surrounds the intermediate member 37. In regard to the front/rear direction, the first damper 36, the intermediate member 37, and the second damper 38 are disposed between the front spacer 32 and the rear spacer 35.

As shown in FIG. 2, the intermediate member 37 is coupled to the sleeve 33 via an elastic body (first damper 36) and is coupled to the inner cylinder 28 via an elastic body (second damper 38). The intermediate member 37 is rotatable around the propeller axis Ap with respect to the sleeve 33 within an elastic range (a range not more than an elastic limit) of the first damper 36. Also, the intermediate member 37 is rotatable around the propeller axis Ap with respect to the inner cylinder 28 within an elastic range of the second damper 38. The first damper 36 transmits the torque around the propeller axis Ap between the sleeve 33 and the intermediate member 37 and absorbs a vibration around the propeller axis Ap between the sleeve 33 and the intermediate member 37. Also, the second damper 38 transmits the torque around the propeller axis Ap between the intermediate member 37 and the inner cylinder 28 and absorbs a vibration around the propeller axis Ap between the intermediate member 37 and the inner cylinder 28. The torque around the propeller axis Ap is thus transmitted between the propeller shaft 7 and the propeller member 22 via the damper unit 23.

As shown in FIG. 2, the intermediate member 37 includes an inner circumferential surface and an outer circumferential surface that are step-shaped and change in diameter in a stepwise manner. The intermediate member 37 includes an upstream cylindrical portion 39 coupled to the first damper 36, an annular step portion 40 defining a step at an intermediate portion of the intermediate member 37 in the front/rear direction, and a downstream cylindrical portion 41 coupled to the second damper 38. The intermediate member 37 may include a plurality of members or may be a single integral member. A case in which the intermediate member 37 includes the plurality of members is shown in FIG. 2.

As shown in FIG. 2, the upstream cylindrical portion 39 surrounds the first damper 36 and the downstream cylindrical portion 41 is surrounded by the second damper 38. The upstream cylindrical portion 39 and the downstream cylindrical portion 41 extend in the front/rear direction along the propeller axis Ap. The upstream cylindrical portion 39 is disposed farther to the front than the downstream cylindrical portion 41. The step portion 40 extends from a rear end of the upstream cylindrical portion 39 to a front end of the downstream cylindrical portion 41. An inner diameter of the upstream cylindrical portion 39 is greater than an outer diameter of the downstream cylindrical portion 41. An inner diameter of the downstream cylindrical portion 41 is greater than the outer diameter of the sleeve 33. The downstream cylindrical portion 41 surrounds the sleeve 33 at a radial interval.

As shown in FIG. 2, the upstream cylindrical portion 39 is disposed farther to the front than the second damper 38 and the downstream cylindrical portion 41 is disposed farther to the rear than the first damper 36. The step portion 40 defines the step interposed between the first damper 36 and the second damper 38. A rear end surface of the first damper 36 and a front end surface of the second damper 38 face the step portion 40 of the intermediate member 37 in the front/rear direction. The first damper 36 and the second damper 38 are aligned in the front/rear direction via the step portion 40. A portion of the second damper 38 is disposed on a straight line L1 passing through the first damper 36 and is parallel or substantially parallel to the propeller axis Ap.

As shown in FIG. 2, the first damper 36 and the second damper 38 are made of an elastic material, such as rubber or resin, etc. Elastic moduli of the first damper 36 and the second damper 38 may be equal to each other or may differ from each other. That is, the first damper 36 may be harder than the second damper 38 or may be softer than the second damper 38 or may have the same hardness as the second damper 38.

As shown in FIG. 2, an inner circumferential portion of the first damper 36 is coupled to an outer circumferential portion of the sleeve 33, for example, by adhesion, and an outer circumferential portion of the first damper 36 is coupled to an inner circumferential portion of the upstream cylindrical portion 39, for example, by a tooth and groove engagement. Similarly, an inner circumferential portion of the second damper 38 is coupled to an outer circumferential portion of the downstream cylindrical portion 41, for example, by adhesion, and an outer circumferential portion of the second damper 38 is coupled to an inner circumferential portion of the inner cylinder 28, for example, by a tooth and groove engagement. The first damper 36 may be coupled to the sleeve 33 by a tooth and groove engagement and be coupled to the upstream cylindrical portion 39 by adhesion. Also, the first damper 36 may be coupled to the sleeve 33 by a tooth and groove engagement and be coupled to the upstream cylindrical portion 39 by a tooth and groove engagement. The same applies to the second damper 38.

As shown in FIG. 3, the upstream cylindrical portion 39 includes an uneven inner circumferential surface provided with a plurality of radially projecting teeth 43. The first damper 36 includes an uneven outer circumferential surface provided with a plurality of radially recessed grooves 44. The plurality of teeth 43 are aligned at intervals in the circumferential direction and extend in the front/rear direction. Similarly, the plurality of grooves 44 are aligned at intervals in the circumferential direction and extend in the front/rear direction. The plurality of teeth 43 are respectively disposed inside the plurality of grooves 44. A pair of tooth surfaces of a tooth 43 respectively contact a pair of inner surfaces of a groove 44. The outer circumferential surface of the first damper 36 is placed in close contact with the inner circumferential surface of the upstream cylindrical portion 39 in a state in which the plurality of teeth 43 are engaged with the first damper 36. As shown in FIG. 2, the inner circumferential surface of the upstream cylindrical portion 39 is tapered toward the rear end of the upstream cylindrical portion 39. The first damper 36 is thus restricted in rearward movement by an inclination of the inner circumferential surface of the upstream cylindrical portion 39.

As shown in FIG. 4, the inner cylinder 28 includes an uneven inner circumferential surface provided with the plurality of teeth 43 projecting radially. The second damper 38 includes an uneven outer circumferential surface provided with the plurality of grooves 44 that are recessed radially. The plurality of teeth 43 are aligned at intervals in the circumferential direction and extend in the front/rear direction. Similarly, the plurality of grooves 44 are aligned at intervals in the circumferential direction and extend in the front/rear direction. The plurality of teeth 43 are respectively disposed inside the plurality of grooves 44. A pair of tooth surfaces of a tooth 43 respectively contact a pair of inner surfaces of a groove 44. The outer circumferential surface of the second damper 38 is placed in close contact with the inner circumferential surface of the inner cylinder 28 in a state in which the plurality of teeth 43 are engaged with the second damper 38. As shown in FIG. 2, the inner circumferential surface of the rear portion of the inner cylinder 28 is tapered toward the rear end of the inner cylinder 28. The second damper 38 is thus restricted in rearward movement by an inclination of the inner circumferential surface of the inner cylinder 28.

The inner circumferential portion of the first damper 36 rotates around the propeller axis Ap together with the sleeve 33 and the outer circumferential portion of the first damper 36 rotates around the propeller axis Ap together with the upstream cylindrical portion 39. The inner circumferential portion of the second damper 38 rotates around the propeller axis Ap together with the downstream cylindrical portion 41 and the outer circumferential portion of the second damper 38 rotates around the propeller axis Ap together with the inner cylinder 28. When the torque around the propeller axis Ap is applied to the first damper 36, the first damper 36 deforms elastically in the circumferential direction, and the inner circumferential portion of the first damper 36 and the outer circumferential portion of the first damper 36 undergo relative movement in the circumferential direction. The sleeve 33 and the intermediate member 37 thus undergo relative movement in the circumferential direction. Similarly, when the torque around the propeller axis Ap is applied to the second damper 38, the second damper 38 deforms elastically in the circumferential direction, and the inner circumferential portion of the second damper 38 and the outer circumferential portion of the second damper 38 undergo relative movement in the circumferential direction. The intermediate member 37 and the inner cylinder 28 thus undergo relative movement in the circumferential direction.

As shown in FIG. 2, the front spacer 32 surrounds the tapered portion 25 of the propeller shaft 7 around the propeller axis Ap. A front end of the front spacer 32 is disposed farther to the front than the tapered portion 25 and a rear end of the front spacer 32 is disposed farther to the rear than the tapered portion 25. The front spacer 32 includes a tapered inner circumferential surface aligned along an outer circumferential surface of the tapered portion 25. The outer circumferential surface of the tapered portion 25 contacts the inner circumferential surface of the front spacer 32. Forward movement of the front spacer 32 with respect to the propeller shaft 7 is restricted by the contact of the outer circumferential surface of the tapered portion 25 and the inner circumferential surface of the front spacer 32.

As shown in FIG. 2, the front spacer 32 includes a cylindrical fitting portion 47 fitted inside the front end portion of the inner cylinder 28 and an annular front pressed portion 48 disposed farther to the front than the inner cylinder 28. The front pressed portion 48 has a disk shape that is coaxial to the fitting portion 47 and has a larger outer diameter than the fitting portion 47. The outer diameter of the front pressed portion 48 is greater than the outer diameter of the sleeve 33. A rear end surface of the front pressed portion 48 faces a front end surface of the inner cylinder 28 in the front/rear direction and an outer circumferential surface of the fitting portion 47 faces the inner circumferential surface of the inner cylinder 28 in the radial direction. The fitting portion 47 and the front pressed portion 48 define a step that houses the front end portion of the inner cylinder 28.

When the propeller shaft 7 and the propeller 8 rotate in the forward rotation direction, the front pressed portion 48 is pressed forward by the inner cylinder 28 and a thrust in the forward drive direction is transmitted from the propeller member 22 to the front spacer 32. The forward drive direction thrust transmitted to the front spacer 32 is transmitted from the front spacer 32 to the tapered portion 25 and is further transmitted from the propeller shaft 7 to the lower case 12. The forward drive direction thrust is thus transmitted from the outboard motor 3 to the hull H1 via the bracket 2 and the hull H1 is propelled forward.

As shown in FIG. 2, the intermediate spacer 34 surrounds the small diameter portion 26 of the propeller shaft 7 around the propeller axis Ap. The intermediate spacer 34 includes a disk-shaped main body 49 surrounding the propeller shaft 7 around the propeller axis Ap and two sub projections 50 extending radially outward from an outer circumferential surface of the main body 49. The main body 49 is disposed behind the sleeve 33. The two sub projections 50 are disposed farther radially outward than the sleeve 33. In regard to the front/rear direction, the two sub projections 50 are disposed between the rear end of the intermediate member 37 and the rear spacer 35. As shown in FIG. 5, the two sub projections 50 are disposed at an interval in the circumferential direction.

As shown in FIG. 5, the main body 49 is disposed inside a rear end portion of the intermediate member 37 and the two sub projections 50 are respectively disposed inside two sub notches 51 provided in the rear end portion of the intermediate member 37. Each sub notch 51 extends forward from a rear end of the intermediate member 37 and opens rearward. Each sub notch 51 is defined by a pair of inner surfaces disposed at an interval in the circumferential direction and a bottom surface connecting front ends of the pair of inner surfaces to each other. A width (length in the circumferential direction) of each sub projection 50 is shorter than a width of each sub notch 51, and in the free state, centers of the sub projections 50 in the circumferential direction are matched with centers of the sub notches 51 in the circumferential direction. A pair of side surfaces of each sub projection 50 thus face the pair of inner surfaces of a sub notch 51 at intervals in the circumferential direction.

As shown in FIG. 2, the intermediate spacer 34 is sandwiched by the sleeve 33 and the rear spacer 35 in the front/rear direction. The intermediate spacer 34 thus rotates around the propeller axis Ap together with the sleeve 33 and the rear spacer 35. On the other hand, the intermediate spacer 34 is not sandwiched by the intermediate member 37 and the rear spacer 35 in the front/rear direction. Therefore, in a state in which the side surfaces of the sub projections 50 are not in contact with the inner surfaces of the sub notches 51, the intermediate spacer 34 and the intermediate member 37 can undergo relative rotation in the circumferential direction. As shown in FIG. 5, when the intermediate spacer 34 and the intermediate member 37 undergo relative rotation around the propeller axis Ap and side surfaces of the sub projections 50 contact inner surfaces of the sub notches 51, the relative rotation of the intermediate spacer 34 and the intermediate member 37 in one rotation direction is restricted.

As shown in FIG. 2, the rear spacer 35 surrounds the small diameter portion 26 of the propeller shaft 7 around the propeller axis Ap. The rear spacer 35 includes a disk-shaped main body 52 surrounding the propeller shaft 7 around the propeller axis Ap and two main projections 53 extending radially outward from an outer circumferential surface of the main body 52. An inner circumferential portion of the main body 52 is spline-connected to the outer circumferential portion of the small-diameter portion 26. The main body 52 is disposed behind the rear end of the intermediate member 37 and the intermediate spacer 34. An outer diameter of the main body 52 is greater than an outer diameter of the rear end of the intermediate member 37. The two main projections 53 are disposed farther radially outward than the rear end of the intermediate member 37. As shown in FIG. 6, the two main projections 53 are disposed at an interval in the circumferential direction.

As shown in FIG. 6, the main body 52 is disposed inside the rear end portion of the inner cylinder 28 and the two main projections 53 are respectively disposed inside two main notches 54 provided in the rear end portion of the inner cylinder 28. Each main notch 54 extends forward from a rear end of the inner cylinder 28 and opens rearward. Each main notch 54 is defined by a pair of inner surfaces disposed at an interval in the circumferential direction and a bottom surface connecting front ends of the pair of inner surfaces to each other. A width (length in the circumferential direction) of each main projection 53 is shorter than a width of each main notch 54, and in the free state, centers of the main projections 53 in the circumferential direction are matched with centers of the main notches 54 in the circumferential direction. A pair of side surfaces of each main projection 53 thus face the pair of side surfaces of a main notch 54 at intervals in the circumferential direction.

As shown in FIG. 2, the rear spacer 35 is sandwiched by the intermediate spacer 34 and the washer W1 in the front/rear direction. The rear spacer 35 thus rotates around the propeller axis Ap together with the intermediate spacer 34 and the washer W1. On the other hand, the rear spacer 35 is not pressed by the inner cylinder 28 and the intermediate member 37. Therefore, in a state in which the side surfaces of the main projections 53 are not in contact with the side surfaces of the main notches 54, the rear spacer 35 and the inner cylinder 28 can undergo relative rotation in the circumferential direction. As shown in FIG. 6, when the rear spacer 35 and the inner cylinder 28 undergo relative rotation around the propeller axis Ap and side surfaces of the main projections 53 contact inner surfaces of the main notches 54, the relative rotation of the rear spacer 35 and the inner cylinder 28 in one rotation direction is restricted. A central angle θ1 (angle around the propeller axis Ap; see FIG. 5) between a side surface of a sub projection 50 and an inner surface of a sub notch 51 may be smaller than or may be equal to a central angle θ2 (angle around the propeller axis Ap; see FIG. 6) between a side surface of a main projection 53 and an inner surface of a main notch 54.

As shown in FIG. 2, the rear spacer 35 includes, in addition to the main body 52 and the main projections 53, a rear pressed portion 55 that faces the inner cylinder 28 in the front/rear direction. The rear pressed portion 55 is a portion that faces the rear end portion of the inner cylinder 28 in the front/rear direction. In FIG. 2, an example where the rear pressed portion 55 includes a portion of the main body 52 and a portion of a main projection 53 is shown. When the propeller shaft 7 and the propeller 8 rotate in a reverse rotation direction, the rear pressed portion 55 is pressed rearward by the inner cylinder 28 and a thrust in a reverse drive direction is transmitted from the propeller member 22 to the rear spacer 35. The reverse drive direction thrust transmitted to the rear spacer 35 is transmitted from the rear spacer 35 to the propeller shaft 7 via the washer W1 and the nut N1 and is further transmitted from the propeller shaft 7 to the lower case 12. The reverse drive direction thrust is thus transmitted from the outboard motor 3 to the hull H1 via the bracket 2 and the hull H1 is propelled in reverse.

Figure 7:
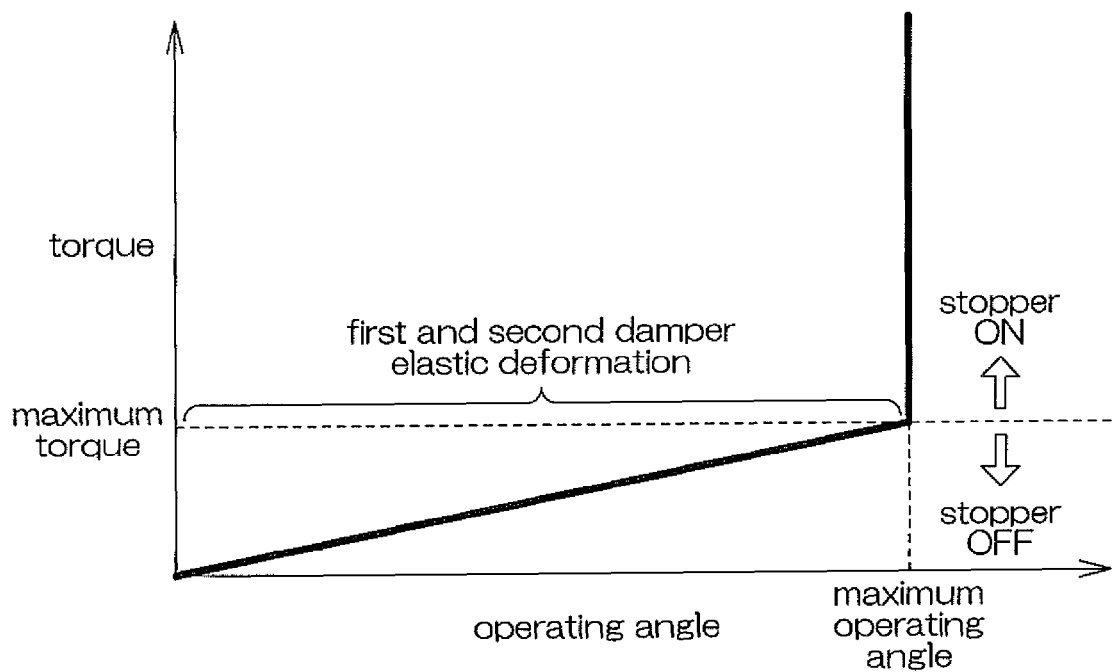
FIG. 7 is a graph of a relationship of an elastic deformation amount (operating angle) of a damper unit in a circumferential direction and a magnitude of a torque applied to the damper unit.

FIG. 7 is a graph of a relationship of an elastic deformation amount (operating angle) of the damper unit 23 in the circumferential direction and a magnitude of the torque applied to the damper unit 23.

The torque around the propeller axis Ap that is transmitted from the engine 4 side to the propeller shaft 7 is transmitted to the propeller member 22 via the damper unit 23. On the other hand, in a case in which a torque around the propeller axis Ap is applied to the propeller member 22 due to collision of a blade 31 of the propeller 22 with a rock or other underwater obstacle, the torque around the propeller axis Ap is transmitted via the damper unit 23 to the propeller shaft 7.

When the torque around the propeller axis Ap is applied to the first damper 36, the first damper 36 twists elastically in the circumferential direction. Therefore, as indicated by thick line arrows in FIG. 5, the sleeve 33 and the intermediate member 37 that are coupled to the first damper 36 undergo relative movement in the circumferential direction and one side surface of each sub projection 50 approaches the inner surface of the sub notch 51 that faces the side surface. When the torque around the propeller axis Ap applied to the first damper 36 reaches a first torque, the side surfaces of the sub projections 50 contact the inner surfaces of the sub notches 51. Also, when the torque around the propeller axis Ap applied to the first damper 36 falls below the first torque, a twist amount (elastic deformation amount) of the first damper 36 decreases and the side surfaces of the sub projections 50 separate from the inner surfaces of the sub notches 51.

Similarly, when the torque around the propeller axis Ap is applied to the second damper 38, the second damper 38 twists elastically in the circumferential direction. Therefore, as indicated by thick line arrows in FIG. 6, the intermediate member 37 and the inner cylinder 28 that are coupled to the second damper 38 undergo relative movement in the circumferential direction and one side surface of each main projection 53 approaches the inner surface of the main notch 54 that faces the side surface. When the torque around the propeller axis Ap applied to the second damper 38 reaches a second torque, the side surfaces of the main projections 53 contact the inner surfaces of the main notches 54. Also, when the torque around the propeller axis Ap applied to the second damper 38 falls below the second torque, a twist amount (elastic deformation amount) of the second damper 38 decreases and the side surfaces of the main projections 53 separate from the inner surfaces of the main notches 54.

The intermediate spacer 34 rotates around the propeller axis Ap together with the propeller shaft 7. When side surfaces of the sub projections 50 contact inner surfaces of the sub notches 51 provided in the intermediate member 37, the propeller shaft 7 and the intermediate member 37 become coupled by the intermediate spacer 34 that can be regarded as a rigid body and the torque transmitted to the propeller shaft 7 is thus transmitted to the intermediate member 37 without involving the first damper 36. Similarly, the rear spacer 35 rotates around the propeller axis Ap together with the propeller shaft 7. When side surfaces of the main projections 53 contact inner surfaces of the main notches 54 provided in the inner cylinder 28, the propeller shaft 7 and the inner cylinder 28 become coupled by the rear spacer 35 that can be regarded as a rigid body and the torque transmitted to the propeller shaft 7 is thus transmitted to the inner cylinder 28 without involving the second damper 38.

The first torque by which side surfaces of the sub protrusions 50 contact inner surfaces of the sub notches 51 may be less than or may be equal to the second torque by which side surfaces of the main projection 53 contact inner surfaces of the main notch 54. A case in which the first torque and the second torque are equal to a maximum torque (torque corresponding to a maximum operating angle) of the damper unit 23 is illustrated in FIG. 7. As shown in FIG. 7, in this case, both the first damper 36 and the second damper 38 deform elastically in the circumferential direction and an operating angle of the entire damper unit 23 increases until the torque applied to the propeller shaft 7 reaches the maximum torque. When the torque applied to the propeller shaft 7 increases to not less than the maximum torque, the increases of the elastic deformation amounts of the first damper 36 and the second damper 38 are restricted by the rear spacer 35 as a main stopper and the intermediate spacer 34 as a sub stopper and the operating angle of the damper unit 23 is maintained fixed.

When the torque applied to the propeller shaft 7 is less than the maximum torque, the torque transmitted to the propeller shaft 7 is transmitted from the propeller shaft 7 to the propeller member 22 via the first damper 36 and the second damper 38. On the other hand, when the torque applied to the propeller shaft 7 is not less than the maximum torque, the torque transmitted to the propeller shaft 7 is transmitted from the propeller shaft 7 to the propeller member 22 without involving the first damper 36 and the second damper 38. Similarly, in a case in which a torque is applied to the propeller member 22 due to collision with an underwater obstacle, the transmission path of the torque is switched according to the magnitude of the torque applied to the propeller member 22.

As described above, with the first preferred embodiment, the first damper 36 and the second damper 38 are disposed in series on the transmission path transmitting the rotation of the engine 4 to the plurality of blades 31. The torque around the propeller axis Ap transmitted to the propeller shaft 7 as the input member is transmitted to the inner cylinder 28 of the propeller member 22 as the output member via the first damper 36, the intermediate member 37, and the second damper 38, in that order. Oppositely, the torque around the propeller axis Ap transmitted to the inner cylinder 28 is transmitted to the propeller shaft 7 via the second damper 38, the intermediate member 37, and the first damper 36, in that order.

The first damper 36 and the second damper 38 are disposed in series and therefore, torques of substantially equal magnitudes are applied to the first damper 36 and the second damper 38 and the first damper 36 and the second damper 38 deform elastically in the circumferential direction (direction around the propeller axis Ap). The maximum operating angle of the damper unit 23 is a sum of a maximum operating angle of the first damper 36 and a maximum operating angle of the second damper 38. Therefore, with the vessel propulsion apparatus 1, the maximum operating angle of the damper unit 23 can be increased while maintaining the maximum torque (torque corresponding to the maximum operating angle) at not less than a fixed value.

Further, a portion of the second damper 38 is disposed on the straight line L1 passing through the first damper 36 and is parallel or substantially parallel to the propeller axis Ap and therefore, the portion of the second damper 38 and the first damper 36 are aligned in the axial direction (direction along the propeller axis Ap). The damper unit 23 can thus have a smaller outer diameter than in a case in which the first damper 36 and the second damper 38 are disposed concentrically. Therefore, even in a case in which the engine 4 is an internal combustion engine and the damper unit 23 is disposed in the interior of the propeller 8 that defines the exhaust passage 20, any reduction of an area of the exhaust passage 20 can be minimized. As a result, lowering of an output of the vessel propulsion apparatus 1 can be minimized.

Second Preferred Embodiment

Figure 8:
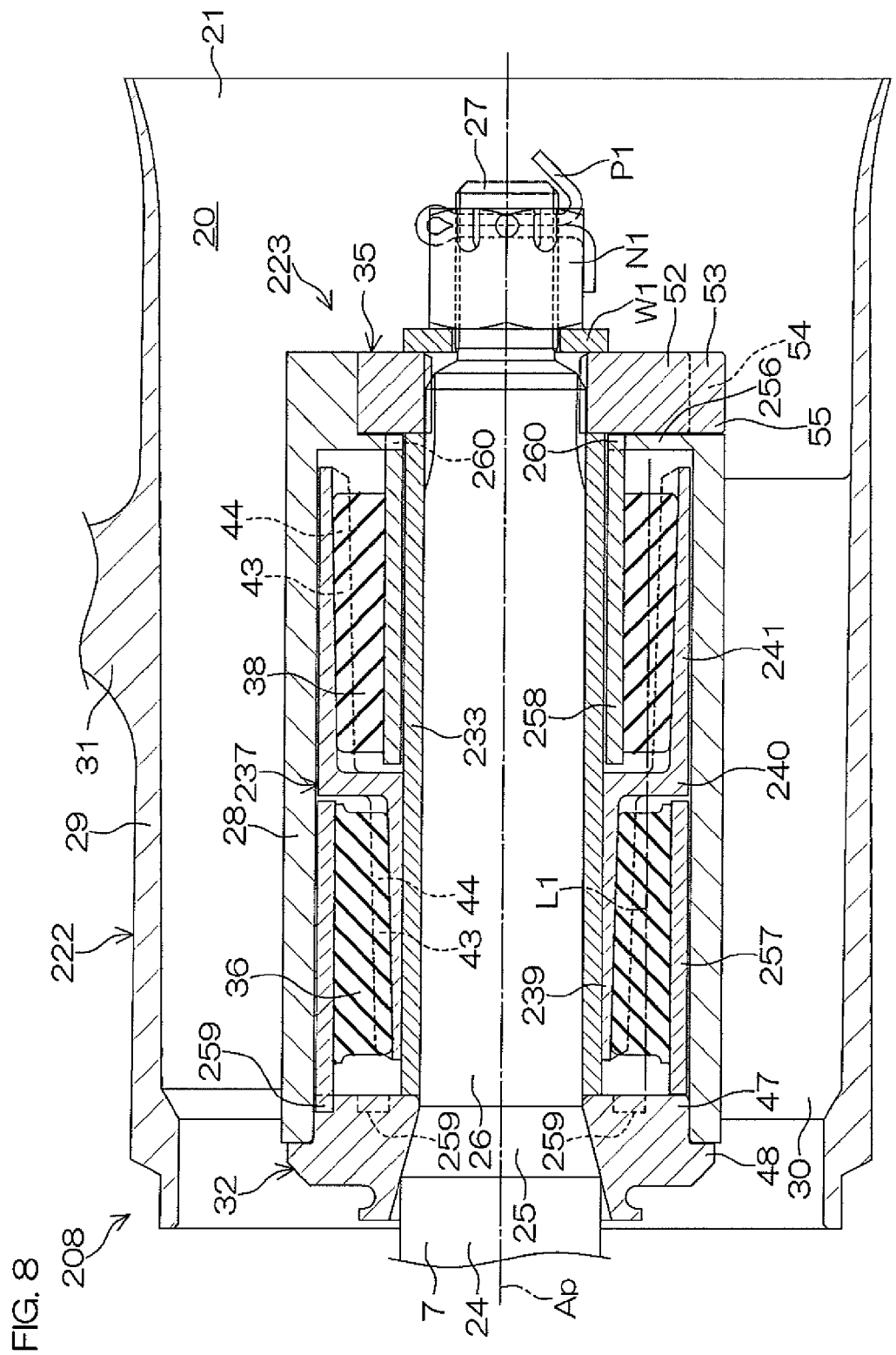
FIG. 8 is a sectional view of a propeller shaft and a propeller according to a second preferred embodiment of the present invention.

FIG. 8 is a sectional view of the propeller shaft 7 and a propeller 208 according to a second preferred embodiment of the present invention. A free state in which a torque is not applied to a damper unit 223 is illustrated in FIG. 8. In the following, the damper unit 223 in the free state shall be described unless noted otherwise. Also, in FIG. 8, component portions equivalent to respective portions shown in FIG. 1 to FIG. 7 described above shall be provided with the same reference symbols as in FIG. 1, etc., and description thereof shall be omitted.

The propeller 208 according to the second preferred embodiment includes a cylindrical propeller member 222 that generates a thrust and the cylindrical damper unit 223 that is detachably mounted on the propeller member 222. The propeller 208 is detachably mounted on the rear end portion of the propeller shaft 7 by the washer W1 and the nut N1.

In addition to the inner cylinder 28, the outer cylinder 29, the plurality of ribs 30, and the plurality of blades 31, the propeller member 222 includes a disk-shaped rear flange 256 provided at a rear end portion of the inner cylinder 28. The rear flange 256 is coaxial to the inner cylinder 28 and projects radially inward from the inner circumferential surface of the inner cylinder 28. In regard to the front/rear direction, the rear flange 256 is disposed between the second damper 38 and the rear spacer 35. The rear flange 256 is continuous across an entire circumference and surrounds a rear end portion of a sleeve 233 around the propeller axis Ap. A rear end surface of the rear flange 256 faces a front end surface of the rear spacer 35.

The damper unit 223 is disposed on the propeller axis Ap. The damper unit 223 is housed inside the outer cylinder 29 of the propeller member 222. With the exception of the sleeve and the intermediate member, the damper unit 223 preferably has the same arrangement as the damper unit 23 according to the first preferred embodiment. Specifically, the damper unit 223 includes, in place of the sleeve 33 and the intermediate member 37 according to the first preferred embodiment, the cylindrical sleeve 233 mounted on the propeller shaft 7, and a cylindrical intermediate member 237 arranged to transmit a torque from the first damper 36 to the downstream side. Further, the damper unit 223 includes an outer sleeve 257 arranged to rotate around the propeller axis Ap together with the front spacer 32, and an inner sleeve 258 arranged to rotate around the propeller axis Ap together with the inner cylinder 28.

The sleeve 233 is disposed inside the inner cylinder 28. A front end of the sleeve 233 is disposed farther to the rear than the front end of the inner cylinder 28 and a rear end of the sleeve 233 is disposed farther to the front than the rear end of the inner cylinder 28. The sleeve 233 surrounds the small diameter portion 26 of the propeller shaft 7 around the propeller axis Ap. The sleeve 233 is disposed between the front spacer 32 and the rear spacer 35. An outer diameter of the sleeve 233 is smaller than the outer diameters of the front spacer 32 and the rear spacer 35. The sleeve 233 is sandwiched in the front/rear direction by the front spacer 32 and the rear spacer 35. The sleeve 233 thus rotates around the propeller axis Ap together with the propeller shaft 7 even though the sleeve 233 is not spline-connected to the propeller shaft 7.

The outer sleeve 257 and the inner sleeve 258 are disposed inside the inner cylinder 28. The outer sleeve 257 is disposed farther to the front than the inner sleeve 258. A front end of the outer sleeve 257 is disposed farther to the rear than the front end of the inner cylinder 28 and a rear end of the inner sleeve 258 is disposed farther to the front than the rear end of the inner cylinder 28. The outer sleeve 257 surrounds the first damper 36 around the propeller axis Ap, and the inner sleeve 258 is surrounded by the second damper 38 around the propeller axis Ap. An inner diameter of the outer sleeve 257 is greater than an outer diameter of the inner sleeve 258. An inner diameter of the inner sleeve 258 is greater than an outer diameter of the sleeve 233. The inner sleeve 258 surrounds the sleeve 233 at a radial interval. In regard to the front/rear direction, the outer sleeve 257 and the inner sleeve 258 are disposed between the front spacer 32 and the rear spacer 35.

The outer sleeve 257 includes an uneven front end surface provided with a plurality of claws 259 projecting forward. The plurality of claws 259 are aligned at intervals in the circumferential direction. The plurality of claws 259 are respectively disposed inside a plurality of grooves provided in the fitting portion 47 of the front spacer 32. The plurality of grooves are aligned at intervals in the circumferential direction and are recessed forward from a rear end surface of the front spacer 32. The plurality of claws 259 are thus engaged with the front spacer 32 from the rear. A torque around the propeller axis Ap is transmitted between the front spacer 32 and the outer sleeve 257 by contact of side surfaces of the claws 259 with inner surfaces of the grooves. The outer sleeve 257 and the front spacer 32 thus rotate integrally around the propeller axis Ap. The outer sleeve 257 thus rotates around the propeller axis Ap together with the propeller shaft 7.

The inner sleeve 258 includes an uneven rear end surface provided with a plurality of claws 260 that project rearward. The plurality of claws 260 are aligned at intervals in the circumferential direction. The plurality of claws 260 are respectively disposed inside a plurality of grooves provided in an inner circumferential portion of the rear flange 256. The plurality of grooves are aligned at intervals in the circumferential direction and penetrate through the rear flange 256 in the front/rear direction. The plurality of claws 260 are engaged with the rear flange 256 from the front. The torque around the propeller axis Ap is transmitted between the rear flange 256 and the inner sleeve 258 by contact of side surfaces of the claws 260 with inner surfaces of the grooves. The inner cylinder 28 and the inner sleeve 258 thus rotate integrally around the propeller axis Ap.

The intermediate member 237 includes an inner circumferential surface and outer circumferential surface that are step-shaped and change in diameter in a stepwise manner. The intermediate member 237 includes an upstream cylindrical portion 239 coupled to the first damper 36, an annular step portion 240 defining a step at an intermediate portion of the intermediate member 237, and a downstream cylindrical portion 241 coupled to the second damper 38.

The upstream cylindrical portion 239 is surrounded by the first damper 36 and the downstream cylindrical portion 241 surrounds the second damper 38. The upstream cylindrical portion 239 and the downstream cylindrical portion 241 extend in the front/rear direction along the propeller axis Ap. The upstream cylindrical portion 239 is disposed farther to the front than the downstream cylindrical portion 241. The step portion 240 extends from a rear end of the upstream cylindrical portion 239 to a front end of the downstream cylindrical portion 241. An outer diameter of the upstream cylindrical portion 239 is smaller than an inner diameter of the downstream cylindrical portion 241. An inner diameter of the upstream cylindrical portion 239 is greater than the outer diameter of the sleeve 233. The upstream cylindrical portion 239 surrounds the sleeve 233 at a radial interval.

The upstream cylindrical portion 239 is disposed farther to the front than the second damper 38. The downstream cylindrical portion 241 is disposed farther to the rear than the first damper 36. The step portion 240 defines the step interposed between the first damper 36 and the second damper 38. The rear end surface of the first damper 36 and the front end surface of the second damper 38 face the step portion 240. The first damper 36 and the second damper 38 are aligned in the front/rear direction via the step portion 240. A portion of the second damper 38 is disposed on the straight line L1 passing through the first damper 36 and is parallel or substantially parallel to the propeller axis Ap.

The outer sleeve 257 is disposed in front of the downstream cylindrical portion 241 and the inner sleeve 258 is disposed behind the upstream cylindrical portion 239. A rear end portion of the outer sleeve 257 and a front end portion of the inner sleeve 258 face the step portion 240 at intervals in the front/rear direction. The outer sleeve 257 is disposed between the front spacer 32 and the intermediate member 237, and the inner sleeve 258 is disposed between the intermediate member 237 and the rear spacer 35. The intermediate member 237 is rotatable around the propeller axis Ap with respect to the outer sleeve 257 and the inner sleeve 258. Further, the intermediate member 237 is rotatable around the propeller axis Ap with respect to the inner cylinder 28 and the sleeve 233.

The inner circumferential portion of the first damper 36 is coupled by a tooth and groove engagement to an outer circumferential portion of the upstream cylindrical portion 239, and the outer circumferential portion of the first damper 36 is coupled by adhesion to an inner circumferential portion of the outer sleeve 257. Similarly, the inner circumferential portion of the second damper 38 is coupled by adhesion to an outer circumferential portion of the inner sleeve 258 and the outer circumferential portion of the second damper 38 is coupled by a tooth and groove engagement to an inner circumferential portion of the downstream cylindrical portion 241. The first damper 36 may be coupled by adhesion to the upstream cylindrical portion 239 and coupled by a tooth and groove engagement to the outer sleeve 257. The same applies to the second damper 38.

The upstream cylindrical portion 239 includes an uneven outer circumferential surface provided with the plurality of radially projecting teeth 43. The first damper 36 includes an uneven inner circumferential surface provided with the plurality of radially recessed grooves 44. The plurality of teeth 43 are respectively disposed inside the plurality of grooves 44. The inner circumferential surface of the first damper 36 is in close contact with the outer circumferential surface of the upstream cylindrical portion 239 in a state in which the plurality of teeth 43 are engaged with the first damper 36. The outer circumferential surface of the upstream cylindrical portion 239 is tapered toward the front end of the upstream cylindrical portion 239. The first damper 36 is thus restricted in rearward movement by an inclination of the outer circumferential surface of the upstream cylindrical portion 239.

The downstream cylindrical portion 241 includes an uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the downstream cylindrical portion 241 in a state in which the plurality of teeth 43 are engaged with the second damper 38. The inner circumferential surface of the downstream cylindrical portion 241 is tapered toward the front end of the downstream cylindrical portion 241. The second damper 38 is thus restricted in forward movement by an inclination of the inner circumferential surface of the downstream cylindrical portion 241.

The inner circumferential portion of the first damper 36 rotates around the propeller axis Ap together with the intermediate member 237, and the outer circumferential portion of the first damper 36 rotates around the propeller axis Ap together with the outer sleeve 257. The inner circumferential portion of the second damper 38 rotates around the propeller axis Ap together with the inner sleeve 258 and the outer circumferential portion of the second damper 38 rotates around the propeller axis Ap together with the intermediate member 237. When the torque around the propeller axis Ap is applied to the first damper 36, the first damper 36 deforms elastically in the circumferential direction and the inner circumferential portion of the first damper 36 and the outer circumferential portion of the first damper 36 undergo relative movement in the circumferential direction. The outer sleeve 257 and the intermediate member 237 thus undergo relative movement in the circumferential direction. Similarly, when the torque around the propeller axis Ap is applied to the second damper 38, the second damper 38 deforms elastically in the circumferential direction and the inner circumferential portion of the second damper 38 and the outer circumferential portion of the second damper 38 undergo relative movement in the circumferential direction. The intermediate member 237 and the inner sleeve 258 thus undergo relative movement in the circumferential direction.

When the torque applied to the propeller shaft 7 is less than a maximum torque (torque corresponding to a maximum operating angle) of the damper unit 223, the torque transmitted to the propeller shaft 7 is transmitted from the front spacer 32 to the outer sleeve 257 and transmitted further from the outer sleeve 257 to the first damper 36. The torque transmitted to the first damper 36 is transmitted from the intermediate member 237 to the second damper 38 and further transmitted from the second damper 38 to the inner sleeve 258. The torque transmitted to the inner sleeve 258 is transmitted to the inner cylinder 28 of the propeller member 222. The torque around the propeller axis Ap is thus transmitted from the propeller shaft 7 to the propeller member 222 via the damper unit 223.

Third Preferred Embodiment

Figure 9:
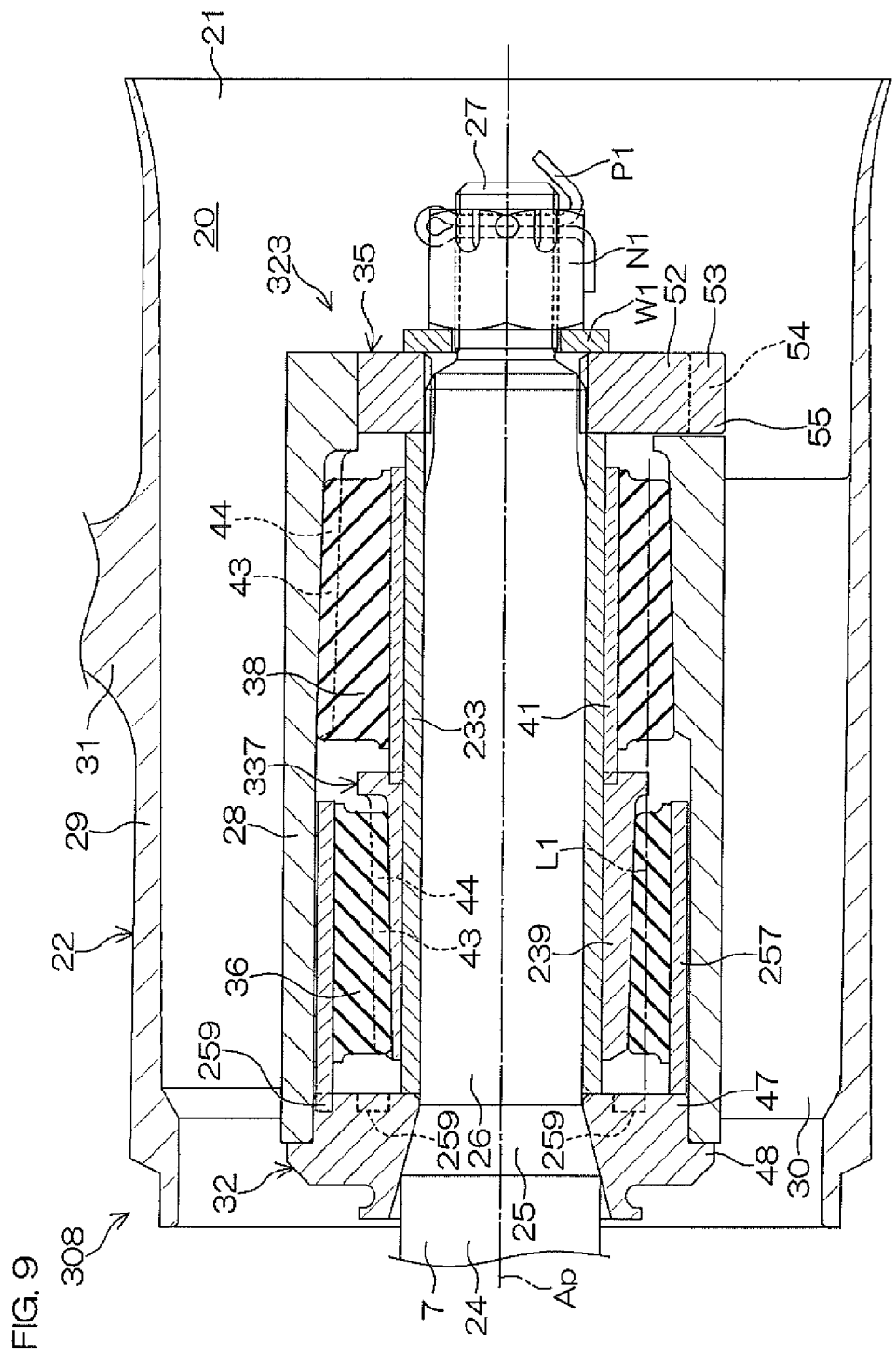
FIG. 9 is a sectional view of a propeller shaft and a propeller according to a third preferred embodiment of the present invention.

FIG. 9 is a sectional view of the propeller shaft 7 and a propeller 308 according to a third preferred embodiment of the present invention. A free state in which a torque is not applied to a damper unit 323 is illustrated in FIG. 9. In the following, the damper unit 323 in the free state shall be described unless noted otherwise. Also, in FIG. 9, component portions equivalent to respective portions shown in FIG. 1 to FIG. 8 described above shall be provided with the same reference symbols as in FIG. 1, etc., and description thereof shall be omitted.

The propeller 308 according to the third preferred embodiment includes the propeller member 22 according to the first preferred embodiment and the cylindrical damper unit 323 that is detachably mounted on the propeller member 22. The propeller 308 is detachably mounted on the rear end portion of the propeller shaft 7 by the washer W1 and the nut N1.

The damper unit 323 is disposed on the propeller axis Ap. The damper unit 323 is housed inside the outer cylinder 29 of the propeller member 22. With the exception of the sleeve and the intermediate member, the damper unit 323 preferably has the same arrangement as the damper unit 23 according to the first preferred embodiment. Specifically, the damper unit 323 includes, in place of the sleeve 33 according to the first preferred embodiment, the sleeve 233 according to the second preferred embodiment. Further, the damper unit 323 includes, in place of the intermediate member 37 according to the first preferred embodiment, a cylindrical intermediate member 337 transmitting a torque from the first damper 36 to the downstream side. Further, the damper unit 323 includes the outer sleeve 257 according to the second preferred embodiment.

The intermediate member 337 surrounds the sleeve 233. The intermediate member 337 is rotatable around the propeller axis Ap with respect to the sleeve 233. The intermediate member 337 includes a step-shaped outer circumferential surface that changes in diameter in a stepwise manner. The intermediate member 337 includes the upstream cylindrical portion 239 according to the second preferred embodiment and the downstream cylindrical portion 41 according to the first preferred embodiment. The first damper 36 surrounds the upstream cylindrical portion 239 and the second damper 38 surrounds the downstream cylindrical portion 41. The first damper 36 is disposed between the upstream cylindrical portion 239 and the outer sleeve 257 and the second damper 38 is disposed between the downstream cylindrical portion 41 and the inner cylinder 28. The upstream cylindrical portion 239 is disposed in front of the downstream cylindrical portion 41. The rear end portion of the upstream cylindrical portion 239 and the front end portion of the downstream cylindrical portion 41 are coupled by a tooth and groove engagement. The upstream cylindrical portion 239 and the downstream cylindrical portion 41 thus rotate integrally around the propeller axis Ap.

The inner circumferential portion of the first damper 36 is coupled by a tooth and groove engagement to the outer circumferential portion of the upstream cylindrical portion 239, and the outer circumferential portion of the first damper 36 is coupled by adhesion to the inner circumferential portion of the outer sleeve 257. Similarly, the inner circumferential portion of the second damper 38 is coupled by adhesion to the outer circumferential portion of the downstream cylindrical portion 41 and the outer circumferential portion of the second damper 38 is coupled by a tooth and groove engagement to the inner circumferential portion of the inner cylinder 28. The first damper 36 may be coupled by adhesion to the upstream cylindrical portion 239 and coupled by a tooth and groove engagement to the outer sleeve 257. The same applies to the second damper 38.

The upstream cylindrical portion 239 includes the uneven outer circumferential surface provided with the plurality of radially projecting teeth 43. The first damper 36 includes the uneven inner circumferential surface provided with the plurality of radially recessed grooves 44. The plurality of teeth 43 are respectively disposed inside the plurality of grooves 44. The inner circumferential surface of the first damper 36 is in close contact with the outer circumferential surface of the upstream cylindrical portion 239 in a state in which the plurality of teeth 43 are engaged with the first damper 36. The outer circumferential surface of the upstream cylindrical portion 239 is tapered toward the front end of the upstream cylindrical portion 239. The first damper 36 is thus restricted in rearward movement by the inclination of the outer circumferential surface of the upstream cylindrical portion 239.

The inner cylinder 28 includes the uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the inner cylinder 28 in a state in which the plurality of teeth 43 are engaged with the second damper 38. The inner circumferential surface of the rear portion of the inner cylinder 28 is tapered toward the rear end of the inner cylinder 28. The second damper 38 is thus restricted in rearward movement by the inclination of the inner circumferential surface of the inner cylinder 28.

When a torque around the propeller axis Ap is applied to the first damper 36, the first damper 36 deforms elastically in the circumferential direction and the inner circumferential portion of the first damper 36 and the outer circumferential portion of the first damper 36 undergo relative movement in the circumferential direction. The outer sleeve 257 and the intermediate member 337 thus undergo relative movement in the circumferential direction. Similarly, when the torque around the propeller axis Ap is applied to the second damper 38, the second damper 38 deforms elastically in the circumferential direction and the inner circumferential portion of the second damper 38 and the outer circumferential portion of the second damper 38 undergo relative movement in the circumferential direction. The intermediate member 337 and the inner cylinder 28 thus undergo relative movement in the circumferential direction.

When the torque applied to the propeller shaft 7 is less than a maximum torque (torque corresponding to a maximum operating angle) of the damper unit 323, the torque transmitted to the propeller shaft 7 is transmitted from the front spacer 32 to the outer sleeve 257 and transmitted further from the outer sleeve 257 to the first damper 36. The torque transmitted to the first damper 36 is transmitted from the intermediate member 337 to the second damper 38. The torque transmitted to the second damper 38 is transmitted to the inner cylinder 28 of the propeller member 22. The torque around the propeller axis Ap is thus transmitted from the propeller shaft 7 to the propeller member 22 via the damper unit 323.

Fourth Preferred Embodiment

Figure 10:
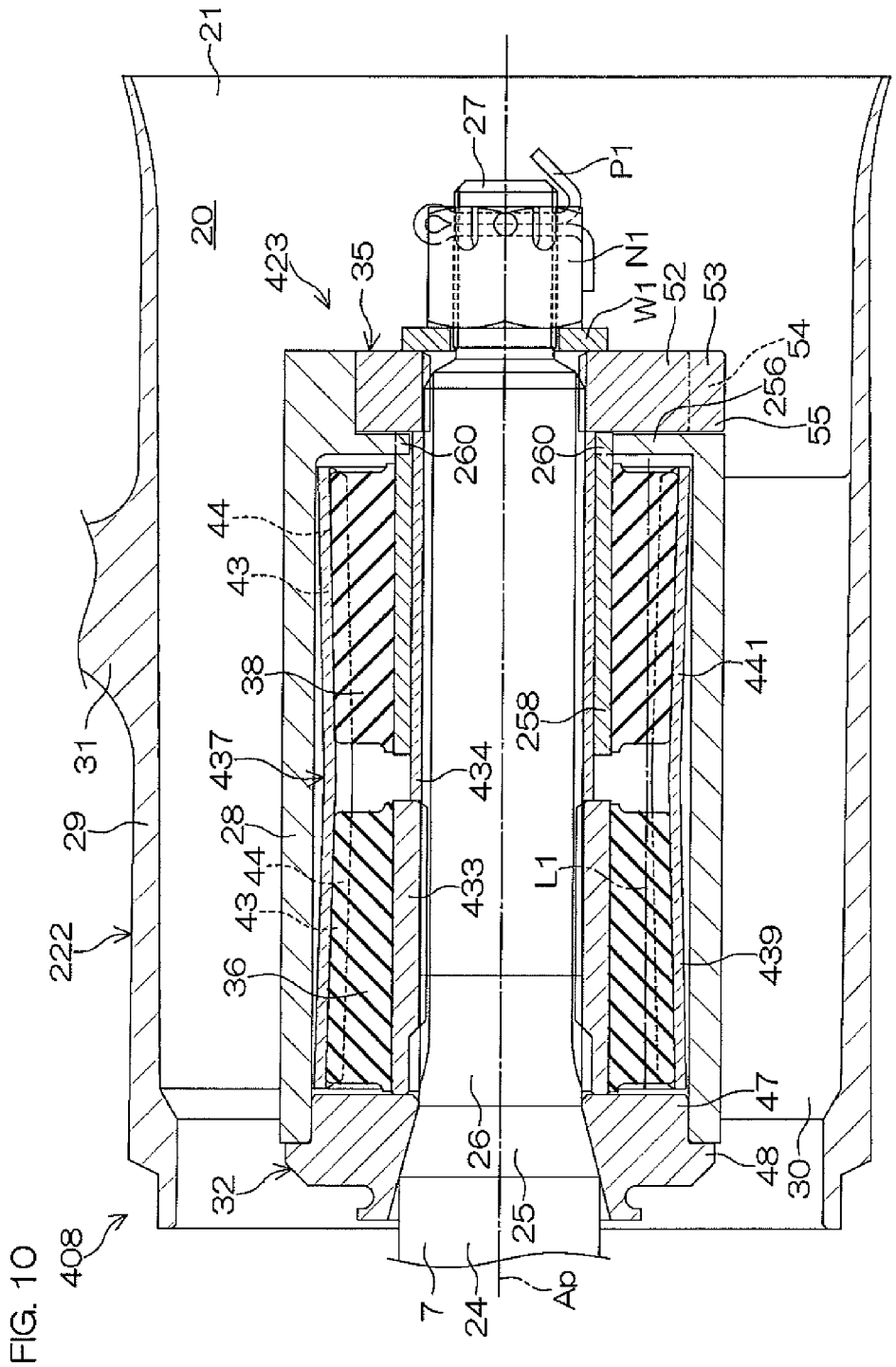
FIG. 10 is a sectional view of a propeller shaft and a propeller according to a fourth preferred embodiment of the present invention.

FIG. 10 is a sectional view of the propeller shaft 7 and a propeller 408 according to a fourth preferred embodiment of the present invention. A free state in which a torque is not applied to a damper unit 423 is illustrated in FIG. 10. In the following, the damper unit 423 in the free state shall be described unless noted otherwise. Also, in FIG. 10, component portions equivalent to respective portions shown in FIG. 1 to FIG. 9 described above shall be provided with the same reference symbols as in FIG. 1, etc., and description thereof shall be omitted.

The propeller 408 according to the fourth preferred embodiment includes the propeller member 222 according to the second preferred embodiment and the cylindrical damper unit 423 that is detachably mounted on the propeller member 222. The propeller 408 is detachably mounted on the rear end portion of the propeller shaft 7 by the washer W1 and the nut N1.

The damper unit 423 is disposed on the propeller axis Ap. The damper unit 423 is housed inside the outer cylinder 29 of the propeller member 222. With the exception of the sleeve, the intermediate spacer, and the intermediate member, the damper unit 423 preferably has the same arrangement as the damper unit 23 according to the first preferred embodiment. Specifically, the damper unit 423 includes, in place of the sleeve 33 and the intermediate spacer 34 according to the first preferred embodiment, a sleeve 433 and an intermediate spacer 434 that are cylindrical and are mounted on the propeller shaft 7. Further, the damper unit 423 includes, in place of the intermediate member 37 according to the first preferred embodiment, a cylindrical intermediate member 437 transmitting a torque from the first damper 36 to the downstream side. Further, the damper unit 423 includes the inner sleeve 258 according to the second preferred embodiment.

The sleeve 433 and the intermediate spacer 434 are disposed inside the inner cylinder 28. The sleeve 433 and the intermediate spacer 434 extend in the front/rear direction along the propeller axis Ap. The sleeve 433 is disposed behind the front spacer 32 and the intermediate spacer 434 is disposed behind the sleeve 433. A front end of the sleeve 433 is disposed farther to the rear than the front end of the inner cylinder 28 and a rear end of the intermediate spacer 434 is disposed farther to the front than the rear end of the inner cylinder 28. The front end of the sleeve 433 is in contact with the front spacer 32, and a front end of the intermediate spacer 434 is in contact with the sleeve 433. The front end surface of the rear spacer 35 is in contact with the intermediate spacer 434. The front spacer 32, the sleeve 433, the intermediate spacer 434, and the rear spacer 35 are pressed forward by the washer W1 and the nut N1. The front spacer 32, the sleeve 433, the intermediate spacer 434, and the rear spacer 35 are thus fixed to the propeller shaft 7.

The sleeve 433 is longer in the front/rear direction than the front spacer 32 and the rear spacer 35. The intermediate spacer 434 is longer in the front/rear direction than the sleeve 433. The intermediate spacer 433 is thus the longest in the front/rear direction among the front spacer 32, the sleeve 433, the intermediate spacer 434, and the rear spacer 35. Also, an outer diameter of the sleeve 433 is smaller than the outer diameters of the front spacer 32 and the rear spacer 35. An outer diameter of the intermediate spacer 434 is smaller than the outer diameters of the front spacer 32, the sleeve 433, and the rear spacer 35. The intermediate spacer 434 is thus the smallest in outer diameter among the front spacer 32, the sleeve 433, the intermediate spacer 434, and the rear spacer 35.

The sleeve 433 and the intermediate spacer 434 surround the small diameter portion 26 of the propeller shaft 7 around the propeller axis Ap. The sleeve 433 is surrounded by the first damper 36, and the intermediate spacer 434 is surrounded by the inner sleeve 258. The rear flange 256 surrounds a rear end portion of the intermediate spacer 434. An inner circumferential portion of the sleeve 433 is spline-connected to the small diameter portion 26 of the propeller shaft 7. Although the intermediate spacer 434 is not spline-connected to the small diameter portion 26, it is sandwiched in the front/rear direction by the sleeve 433 and the rear spacer 35 that are spline-connected to the propeller shaft 7. Therefore, as with the sleeve 433, the intermediate spacer 434 also rotates together with the propeller shaft 7 around the propeller axis Ap.

The intermediate member 437 includes an upstream cylindrical portion 439 coupled to the first damper 36 and a downstream cylindrical portion 441 coupled to the second damper 38. The upstream cylindrical portion 439 surrounds the first damper 36 and the downstream cylindrical portion 441 surrounds the second damper 38. The upstream cylindrical portion 439 and the downstream cylindrical portion 441 extend in the front/rear direction along the propeller axis Ap. The upstream cylindrical portion 439 is disposed farther to the front than the downstream cylindrical portion 441. A front end of the upstream cylindrical portion 439 is disposed farther to the rear than the front end of the inner cylinder 28, and a rear end of the downstream cylindrical portion 441 is disposed farther to the front than the rear end of the inner cylinder 28. The upstream cylindrical portion 439 and the downstream cylindrical portion 441 are disposed along the inner circumferential surface of the inner cylinder 28. The intermediate member 437 is rotatable around the propeller axis Ap with respect to the inner cylinder 28. An inner circumferential surface and an outer circumferential surface of the upstream cylindrical portion 439 are tapered toward a rear end of the intermediate member 437. Oppositely, an inner circumferential surface and an outer circumferential surface of the downstream cylindrical portion 441 are tapered toward a front end of the intermediate member 437. The intermediate member 437 thus includes an inner circumferential surface and an outer circumferential surface with hourglass-shaped configurations that are constricted at intermediate portions.

The first damper 36 and the second damper 38 face each other at an interval in the front/rear direction. A portion of the second damper 38 is thus disposed on the straight line L1 passing through the first damper 36 and is parallel or substantially parallel to the propeller axis Ap. The inner circumferential portion of the first damper 36 is coupled by adhesion to an outer circumferential portion of the sleeve 433 and the outer circumferential portion of the first damper 36 is coupled by a tooth and groove engagement to an inner circumferential portion of the upstream cylindrical portion 439. Similarly, the inner circumferential portion of the second damper 38 is coupled by adhesion to the outer circumferential portion of the inner sleeve 258 and the outer circumferential portion of the second damper 38 is coupled by a tooth and groove engagement to an inner circumferential portion of the downstream cylindrical portion 441. The first damper 36 may be coupled by a tooth and groove engagement to the sleeve 433 and coupled by adhesion to the upstream cylindrical portion 439. The same applies to the second damper 38.

The upstream cylindrical portion 439 includes an uneven inner circumferential surface provided with the plurality of radially projecting teeth 43. The first damper 36 includes the uneven outer circumferential surface provided with the plurality of radially recessed grooves 44. The plurality of teeth 43 are respectively disposed inside the plurality of grooves 44. The outer circumferential surface of the first damper 36 is in close contact with the inner circumferential surface of the upstream cylindrical portion 439 in a state in which the plurality of teeth 43 are engaged with the first damper 36. The inner circumferential surface of the upstream cylindrical portion 439 is tapered toward the rear end of the upstream cylindrical portion 439. The first damper 36 is thus restricted in rearward movement by an inclination of the outer circumferential surface of the upstream cylindrical portion 439.

The downstream cylindrical portion 441 includes an uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the downstream cylindrical portion 441 in a state in which the plurality of teeth 43 are engaged with the second damper 38. The inner circumferential surface of the downstream cylindrical portion 441 is tapered toward the front end of the downstream cylindrical portion 441. The second damper 38 is thus restricted in forward movement by an inclination of the inner circumferential surface of the downstream cylindrical portion 441.

When a torque around the propeller axis Ap is applied to the first damper 36, the first damper 36 deforms elastically in the circumferential direction and the inner circumferential portion of the first damper 36 and the outer circumferential portion of the first damper 36 undergo relative movement in the circumferential direction. The sleeve 433 and the intermediate member 437 thus undergo relative movement in the circumferential direction. Similarly, when the torque around the propeller axis Ap is applied to the second damper 38, the second damper 38 deforms elastically in the circumferential direction and the inner circumferential portion of the second damper 38 and the outer circumferential portion of the second damper 38 undergo relative movement in the circumferential direction. The intermediate member 437 and the inner sleeve 258 thus undergo relative movement in the circumferential direction.

When the torque applied to the propeller shaft 7 is less than a maximum torque (torque corresponding to a maximum operating angle) of the damper unit 423, the torque transmitted to the propeller shaft 7 is transmitted from the sleeve 433 to the first damper 36. The torque transmitted to the first damper 36 is transmitted from the intermediate member 437 to the second damper 38. The torque transmitted to the second damper 38 is transmitted from the inner sleeve 258 to the inner cylinder 28 of the propeller member 222. The torque around the propeller axis Ap is thus transmitted from the propeller shaft 7 to the propeller member 222 via the damper unit 423.

Fifth Preferred Embodiment

Figure 11:
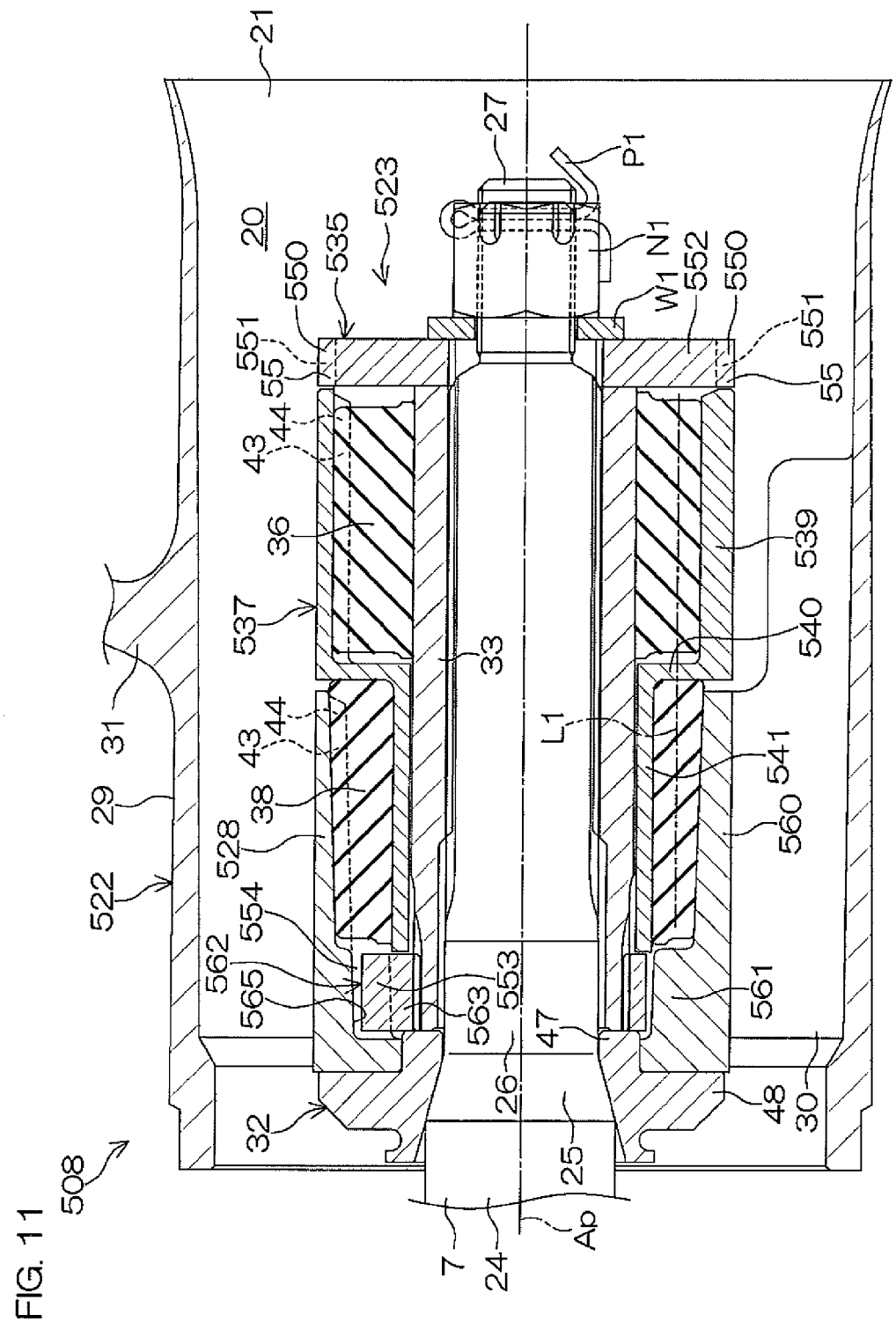
FIG. 11 is a sectional view of a propeller shaft and a propeller according to a fifth preferred embodiment of the present invention.

FIG. 11 is a sectional view of the propeller shaft 7 and a propeller 508 according to a fifth preferred embodiment of the present invention. A free state in which a torque is not applied to a damper unit 523 is illustrated in FIG. 11. In the following, the damper unit 523 in the free state shall be described unless noted otherwise. Also, in FIG. 11, component portions equivalent to respective portions shown in FIG. 1 to FIG. 10 described above shall be provided with the same reference symbols as in FIG. 1, etc., and description thereof shall be omitted.

The propeller 508 according to the fifth preferred embodiment includes a cylindrical propeller member 522 generating thrust and the cylindrical damper unit 523 that is detachably mounted on the propeller member 522. The propeller 508 is detachably mounted on the rear end portion of the propeller shaft 7 by the washer W1 and the nut N1.

With the exception of the inner cylinder, the propeller member 522 preferably has the same arrangement as the propeller member 22 according to the first preferred embodiment. That is, the propeller member 522 includes, in place of the inner cylinder 28 according to the first preferred embodiment, an inner cylinder 528 surrounding the damper unit 523 around the propeller axis Ap. The inner cylinder 528 includes a cylindrical portion 560 extending in the front/rear direction along the propeller axis Ap and a disk-shaped front flange 561 provided at a front end portion of the cylindrical portion 560. The cylindrical portion 560 and the front flange 561 are housed inside the outer cylinder 29.

The cylindrical portion 560 surrounds the damper unit 523 around the propeller axis Ap. The damper unit 523 projects rearward from a rear end portion of the cylindrical portion 560. A front end of the cylindrical portion 560 is disposed farther to the rear than the front end of the outer cylinder 29 and a rear end of the cylindrical portion 560 is disposed farther to the front than the rear end of the outer cylinder 29. Each rib 30 extends from an outer circumferential surface of the cylindrical portion 560 to the inner circumferential surface of the outer cylinder 29. The inner cylinder 528, the outer cylinder 29, the ribs 30, and the blades 31 rotate integrally around the propeller axis Ap.

The front flange 561 is coaxial to the cylindrical portion 560 and extends radially inward from a front end portion of the cylindrical portion 560. The front flange 561 is continuous across an entire circumference and surrounds the fitted portion 47 of the front spacer 32 around the propeller axis Ap. A front end surface of the front flange 561 faces a rear end surface of the front pressed portion 48. When the propeller shaft 7 and the propeller 508 are rotated in the forward rotation direction, the front pressed portion 48 is pressed forward by the front flange 561 and a thrust in the forward drive direction is transmitted from the propeller member 522 to the front spacer 32.

The damper unit 523 is disposed on the propeller axis Ap. The damper unit 523 is housed inside the outer cylinder 29 of the propeller member 522. The damper unit 523 includes the front spacer 32, the sleeve 33, and a rear spacer 535 that are cylindrical and are mounted on the propeller shaft 7. The front spacer 32 is mounted on a front end portion of the inner cylinder 528. An opening defined by the front end portion of the inner cylinder 528 is blocked by the propeller shaft 7 and the front spacer 32. The front end portion of the inner cylinder 528 is supported by the front spacer 32. The front end portion of the inner cylinder 528 is thus supported by the propeller shaft 7 via the front spacer 32.

The damper unit 523 further includes the cylindrical first damper 36 transmitting a torque from the sleeve 33 to the downstream side, a cylindrical intermediate member 537 transmitting the torque from the first damper 36 to the downstream side, and a second damper 38 transmitting the torque from the intermediate member 537 to the propeller member 522. The damper unit 523 further includes a main stopper 562 which causes the propeller shaft 7, as the input member, and the inner cylinder 523, as the output member, to rotate integrally, when the torque transmitted to the damper unit 523 is not less than the second torque.

The first damper 36, the intermediate member 537, and the second damper 38 surround the sleeve 33 around the propeller axis Ap. The first damper 36 is disposed behind the second damper 38. The first damper 36 is surrounded by the intermediate member 537 and the second damper 38 surrounds the intermediate member 537. The first damper 36 is disposed farther to the rear than the inner cylinder 528, and the second damper 38 is disposed inside the inner cylinder 528. A front portion of the intermediate member 537 is disposed inside the inner cylinder 528, and a rear portion of the intermediate member 537 projects rearward from the inner cylinder 528. In regard to the front/rear direction, the first damper 36, the intermediate member 537, and the second damper 38 are disposed between the front spacer 32 and the rear spacer 535.

The intermediate member 537 includes an inner circumferential surface and outer circumferential surface that are step-shaped and change in diameter in a stepwise manner. The intermediate member 537 includes an upstream cylindrical portion 539 coupled to the first damper 36, an annular step portion 540 defining a step at an intermediate portion of the intermediate member 537, and a downstream cylindrical portion 541 coupled to the second damper 38. The upstream cylindrical portion 539 surrounds the first damper 36 and the downstream cylindrical portion 541 is surrounded by the second damper 38. The upstream cylindrical portion 539 and the downstream cylindrical portion 541 extend in the front/rear direction along the propeller axis Ap. The upstream cylindrical portion 539 is disposed farther to the rear than the downstream cylindrical portion 541. The step portion 540 extends from a rear end of the downstream cylindrical portion 541 to a front end of the upstream cylindrical portion 539. The upstream cylindrical portion 539 is disposed farther to the rear than the inner cylinder 528, and the downstream cylindrical portion 541 is disposed inside the inner cylinder 528. An inner diameter of the upstream cylindrical portion 539 is greater than an outer diameter of the downstream cylindrical portion 541. An outer diameter of the upstream cylindrical portion 539 is not more than an outer diameter of the cylindrical portion 560. An inner diameter of the downstream cylindrical portion 541 is greater than the outer diameter of the sleeve 33. The downstream cylindrical portion 541 surrounds the sleeve 33 at a radial interval.

The first damper 36 is disposed between the upstream cylindrical portion 539 and the sleeve 33, and the second damper 38 is disposed between the downstream cylindrical portion 541 and the inner cylinder 528 (cylindrical portion 560). The upstream cylindrical portion 539 is disposed farther to the rear than the second damper 38, and the downstream cylindrical portion 541 is disposed farther to the front than the first damper 36. The step portion 540 defines the step interposed between the first damper 36 and the second damper 38. The front end surface of the first damper 36 and the rear end surface of the second damper 38 face the step portion 540.

The first damper 36 and the second damper 38 are aligned in the front/rear direction via the step portion 540. A portion of the second damper 38 is disposed on the straight line L1 passing through the first damper 36 and is parallel or substantially parallel to the propeller axis Ap.

The inner circumferential portion of the first damper 36 is coupled by adhesion to the outer circumferential portion of the sleeve 33, and the outer circumferential portion of the first damper 36 is coupled by a tooth and groove engagement to an inner circumferential portion of the upstream cylindrical portion 539. Similarly, the inner circumferential portion of the second damper 38 is coupled by adhesion to an outer circumferential portion of the downstream cylindrical portion 541 and the outer circumferential portion of the second damper 38 is coupled by a tooth and groove engagement to an inner circumferential portion of the inner cylinder 528. The first damper 36 may be coupled by a tooth and groove engagement to the sleeve 33 and coupled by adhesion to the upstream cylindrical portion 539. The same applies to the second damper 38.

The upstream cylindrical portion 539 includes an uneven inner circumferential surface provided with the plurality of radially projecting teeth 43. The first damper 36 includes the uneven outer circumferential surface provided with the plurality of radially recessed grooves 44. The plurality of teeth 43 are respectively disposed inside the plurality of grooves 44. The outer circumferential surface of the first damper 36 is in close contact with the inner circumferential surface of the upstream cylindrical portion 539 in a state in which the plurality of teeth 43 are engaged with the first damper 36. The inner circumferential surface of the upstream cylindrical portion 539 is tapered toward the front end of the upstream cylindrical portion 539. The first damper 36 is thus restricted in forward movement by an inclination of the outer circumferential surface of the upstream cylindrical portion 539.

The inner cylinder 528 includes an uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the inner cylinder 528 in a state in which the plurality of teeth 43 are engaged with the second damper 38. The inner circumferential surface of the inner cylinder 528 (inner circumferential surface of the cylindrical portion 560) is tapered toward the front end of the inner cylinder 528. The second damper 38 is thus restricted in forward movement by an inclination of the inner circumferential surface of the inner cylinder 528.

The main stopper 562 is disposed inside the inner cylinder 528. The second damper 38 and the downstream cylindrical portion 541 are disposed behind the main stopper 562. The main stopper 562 surrounds the front end portion of the sleeve 33 around the propeller axis Ap. The main stopper 562 includes a disk-shaped main body 563 surrounding the sleeve 33 around the propeller axis Ap and two main projections 553 extending radially outward from an outer circumferential surface of the main body 563. The two main projections 553 are disposed farther radially outward than the sleeve 33. The two main projections 553 are disposed at an interval in the circumferential direction.

The main stopper 562 is disposed inside a recessed portion 565 defined by the front flange 561 of the inner cylinder 528. The recessed portion 565 is recessed forward. An inner diameter of the recessed portion 565 is smaller than an inner diameter of the cylindrical portion 560. The two main projections 553 are respectively disposed inside two main notches 554 provided in the recessed portion 565. The main notches 554 extend forward from a rear end of the main flange 561 and open rearward. Each main notch 554 is defined by a pair of inner surfaces disposed at an interval in the circumferential direction and a bottom surface connecting front ends of the pair of inner surfaces to each other. A width (length in the circumferential direction) of each main projection 553 is shorter than a width of each main notch 554, and in the free state, centers of the main projections 553 in the circumferential direction are matched with centers of the main notches 554 in the circumferential direction. A pair of side surfaces of each main projection 553 thus face the pair of inner surfaces of a main notch 554 at intervals in the circumferential direction.

An inner circumferential portion of the main stopper 562 is spline-connected to the outer circumferential portion of the sleeve 33. The main stopper 562 thus rotates around the propeller axis Ap together with the sleeve 33 and the propeller shaft 7. On the other hand, the inner cylinder 528 can undergo relative rotation with respect to the front spacer 32. The inner cylinder 528 can thus undergo relative rotation with respect to the propeller shaft 7. Therefore, in a state in which the side surfaces of the main projections 553 are not in contact with the inner surfaces of the main notches 554, the main stopper 562 and the inner cylinder 528 can undergo relative rotation in the circumferential direction. When the main stopper 562 and the inner cylinder 528 undergo relative rotation around the propeller axis Ap and side surfaces of the main projections 553 contact inner surfaces of the main notches 554, the relative rotation of the main stopper 562 and the inner cylinder 528 in one rotation direction is restricted.

The rear spacer 535 surrounds the propeller shaft 7 around the propeller axis Ap. The rear spacer 535 is mounted on a rear end portion of the upstream cylindrical portion 539. An opening defined by a rear end portion of the intermediate member 537 is blocked by the propeller shaft 7 and the rear spacer 535. The rear spacer 535 includes a disk-shaped main body 552 surrounding the propeller shaft 7 around the propeller axis Ap and two sub projections 550 extending radially outward from an outer circumferential surface of the main body 552. The two sub projections 550 are disposed at an interval in the circumferential direction.

The main body 552 is disposed inside a rear end portion of the intermediate member 537 and the two sub projections 550 are respectively disposed inside two sub notches 551 provided in the rear end portion of the intermediate member 537. Each sub notch 551 extends forward from a rear end of the intermediate member 537 and opens rearward. Each sub notch 551 is defined by a pair of inner surfaces disposed at an interval in the circumferential direction and a bottom surface connecting front ends of the pair of inner surfaces to each other. A width (length in the circumferential direction) of each sub projection 550 is shorter than a width of each sub notch 551, and in the free state, centers of the sub projection 550 in the circumferential direction are matched with centers of the sub notches 551 in the circumferential direction. Opposite side surfaces of each sub projection 550 thus face the side surfaces of a sub notch 551 at intervals in the circumferential direction.

The rear spacer 535 as a sub stopper is sandwiched by the sleeve 33 and the washer W1 in the front/rear direction. The rear spacer 535 thus rotates around the propeller axis Ap together with the propeller shaft 7. On the other hand, the intermediate member 537 can undergo relative rotation with respect to the propeller shaft 7. Therefore, in a state in which the side surfaces of the sub projections 550 are not in contact with the side surfaces of the sub notches 551, the rear spacer 535 and the intermediate member 537 can undergo relative rotation in the circumferential direction. When the rear spacer 535 and the intermediate member 537 undergo relative rotation around the propeller axis Ap and side surfaces of the sub projections 550 contact inner surfaces of the sub notches 551, the relative rotation of the rear spacer 535 and the intermediate member 537 in one rotation direction is restricted. A central angle between a side surface of a main projection 553 and an inner surface of a main notch 554 may be smaller than or may be equal to a central angle between a side surface of a sub projection 550 and an inner surface of a sub notch 551.

When the torque applied to the propeller shaft 7 is less than a maximum torque (torque corresponding to a maximum operating angle) of the damper unit 523, the torque transmitted to the propeller shaft 7 is transmitted from the sleeve 33 to the first damper 36. The torque transmitted to the first damper 36 is transmitted from the intermediate member 537 to the second damper 38. The torque transmitted to the second damper 38 is transmitted to the inner cylinder 528 of the propeller member 522. The torque around the propeller axis Ap is thus transmitted from the propeller shaft 7 to the propeller member 522 via the damper unit 523.

Sixth Preferred Embodiment

Figure 12:
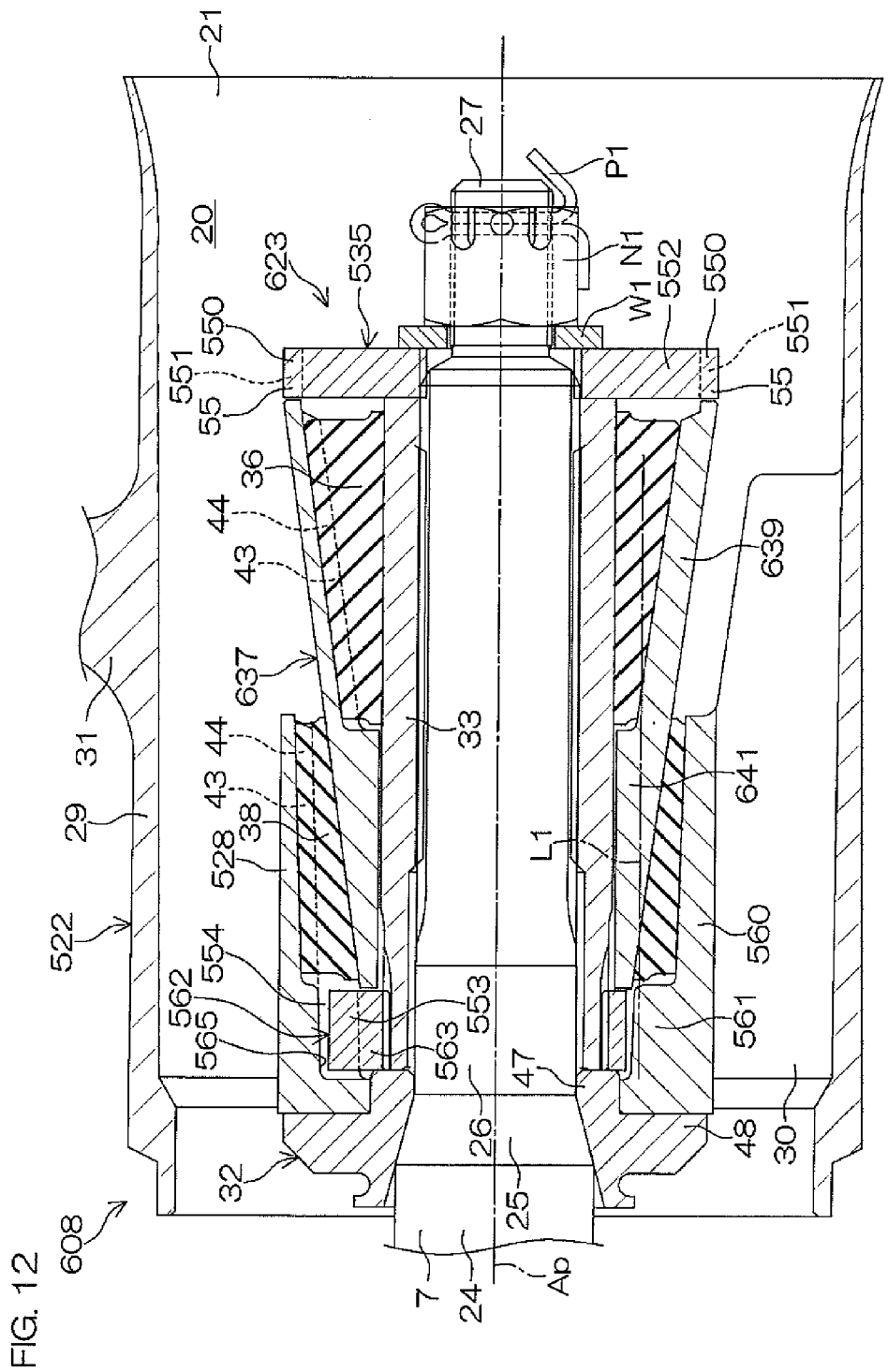
FIG. 12 is a sectional view of a propeller shaft and a propeller according to a sixth preferred embodiment of the present invention.

FIG. 12 is a sectional view of the propeller shaft 7 and a propeller 608 according to a sixth preferred embodiment of the present invention. A free state in which a torque is not applied to a damper unit 623 is illustrated in FIG. 12. In the following, the damper unit 623 in the free state shall be described unless noted otherwise. Also, in FIG. 12, component portions equivalent to respective portions shown in FIG. 1 to FIG. 11 described above shall be provided with the same reference symbols as in FIG. 1, etc., and description thereof shall be omitted.

The propeller 608 according to the sixth preferred embodiment includes the propeller member 522 according to the fifth preferred embodiment and the cylindrical damper unit 623 that is detachably mounted on the propeller member 522. The propeller 608 is detachably mounted on the rear end portion of the propeller shaft 7 by the washer W1 and the nut N1.

The damper unit 623 is disposed on the propeller axis Ap. The damper unit 623 is housed inside the outer cylinder 29 of the propeller member 522. With the exception of the intermediate member, the damper unit 623 preferably has the same arrangement as the damper unit 523 according to the fifth preferred embodiment. That is, the damper unit 623 includes, in place of the intermediate member 537 according to the fifth preferred embodiment, a cylindrical intermediate member 637 transmitting a torque from the first damper 36 to the downstream side.

The intermediate member 637 extends in the front/rear direction along the propeller axis Ap. The intermediate member 637 surrounds the sleeve 33 around the propeller axis Ap. The intermediate member 337 includes a conical outer circumferential surface that changes in diameter in a continuous manner and a step-shaped inner circumferential surface that changes in diameter in a stepwise manner. A front end portion of the intermediate member 637 is disposed inside the inner cylinder 528. The intermediate member 637 projects rearward from the rear end portion of the inner cylinder 528. In regard to the front/rear direction, the intermediate member 637 is disposed between the front spacer 32 and the rear spacer 535.

The main stopper 562 is disposed in front of the intermediate member 637, and the rear spacer 535 is mounted on a rear end portion of the intermediate member 637. An opening defined by the rear end portion of the intermediate member 637 is blocked by the propeller shaft 7 and the rear spacer 535. The main body 552 of the rear spacer 535 is disposed inside the rear end portion of the intermediate member 637 and the two sub projections 550 of the rear spacer 535 are respectively disposed inside the two sub notches 551 provided in the rear end portion of the intermediate member 637.

The intermediate member 637 includes an upstream cylindrical portion 639 coupled to the first damper 36 and a downstream cylindrical portion 641 coupled to the second damper 38. The upstream cylindrical portion 639 surrounds the first damper 36 and the downstream cylindrical portion 641 is surrounded by the second damper 38. The upstream cylindrical portion 639 and the downstream cylindrical portion 641 extend in the front/rear direction along the propeller axis Ap. The upstream cylindrical portion 639 is disposed farther to the rear than the downstream cylindrical portion 641. The upstream cylindrical portion 639 is disposed farther to the rear than the inner cylinder 528, and the downstream cylindrical portion 641 is disposed inside the inner cylinder 528.

An outer diameter and an inner diameter of the upstream cylindrical portion 639 increase in a continuous manner as a rear end of the intermediate member 637 is approached. Similarly, an outer diameter of the downstream cylindrical portion 641 increases in a continuous manner as the rear end of the intermediate member 637 is approached. The outer diameter of the upstream cylindrical portion 639 is greater than the outer diameter of the downstream cylindrical portion 641. A maximum outer diameter of the upstream cylindrical portion 639 is not more than the outer diameter of the cylindrical portion 560 of the inner cylinder 528. An inner diameter of the downstream cylindrical portion 641 is fixed and is greater than the outer diameter of the sleeve 33. The downstream cylindrical portion 641 surrounds the sleeve 33 at a radial interval. A thickness (radial distance from an inner circumferential surface to an outer circumferential surface) of the upstream cylindrical portion 639 is fixed, and a thickness of the downstream cylindrical portion 641 increases in a continuous manner as the rear end of the intermediate member 637 is approached.

The first damper 36 is disposed between the upstream cylindrical portion 639 and the sleeve 33, and the second damper 38 is disposed between the downstream cylindrical portion 641 and the inner cylinder 528 (cylindrical portion 560). A rear end portion of the upstream cylindrical portion 639 is disposed farther to the rear than the second damper 38, and a front end portion of the downstream cylindrical portion 641 is disposed farther to the front than the first damper 36. A portion of the second damper 38 is disposed on the straight line L1 passing through the first damper 36 and is parallel or substantially parallel to the propeller axis Ap.

The inner circumferential portion of the first damper 36 is coupled by adhesion to the outer circumferential portion of the sleeve 33 and the outer circumferential portion of the first damper 36 is coupled by a tooth and groove engagement to an inner circumferential portion of the upstream cylindrical portion 639. Similarly, the inner circumferential portion of the second damper 38 is coupled by adhesion to an outer circumferential portion of the downstream cylindrical portion 641 and the outer circumferential portion of the second damper 38 is coupled by a tooth and groove engagement to the inner circumferential portion of the inner cylinder 528. The first damper 36 may be coupled by a tooth and groove engagement to the sleeve 33 and coupled by adhesion to the upstream cylindrical portion 639. The same applies to the second damper 38.

The upstream cylindrical portion 639 includes an uneven inner circumferential surface provided with the plurality of radially projecting teeth 43. The first damper 36 includes the uneven outer circumferential surface provided with the plurality of radially recessed grooves 44. The plurality of teeth 43 are respectively disposed inside the plurality of grooves 44. The outer circumferential surface of the first damper 36 is in close contact with the inner circumferential surface of the upstream cylindrical portion 639 in a state in which the plurality of teeth 43 are engaged with the first damper 36. The inner circumferential surface of the upstream cylindrical portion 639 is tapered toward the front end of the upstream cylindrical portion 639. The first damper 36 is thus restricted in forward movement by an inclination of the inner circumferential surface of the upstream cylindrical portion 639.

The downstream cylindrical portion 641 includes an uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the downstream cylindrical portion 641 in a state in which the plurality of teeth 43 are engaged with the second damper 38. The inner circumferential surface of the downstream cylindrical portion 641 is tapered toward the front end of the downstream cylindrical portion 641. The second damper 38 is thus restricted in forward movement by an inclination of the inner circumferential surface of the downstream cylindrical portion 641.

When a torque applied to the propeller shaft 7 is less than a maximum torque (torque corresponding to a maximum operating angle) of the damper unit 623, the torque transmitted to the propeller shaft 7 is transmitted from the sleeve 33 to the first damper 36. The torque transmitted to the first damper 36 is then transmitted from the intermediate member 637 to the second damper 38. The torque transmitted to the second damper 38 is transmitted to the inner cylinder 528 of the propeller member 522. The torque around the propeller axis Ap is thus transmitted from the propeller shaft 7 to the propeller member 522 via the damper unit 623.

Seventh Preferred Embodiment

Figure 13:
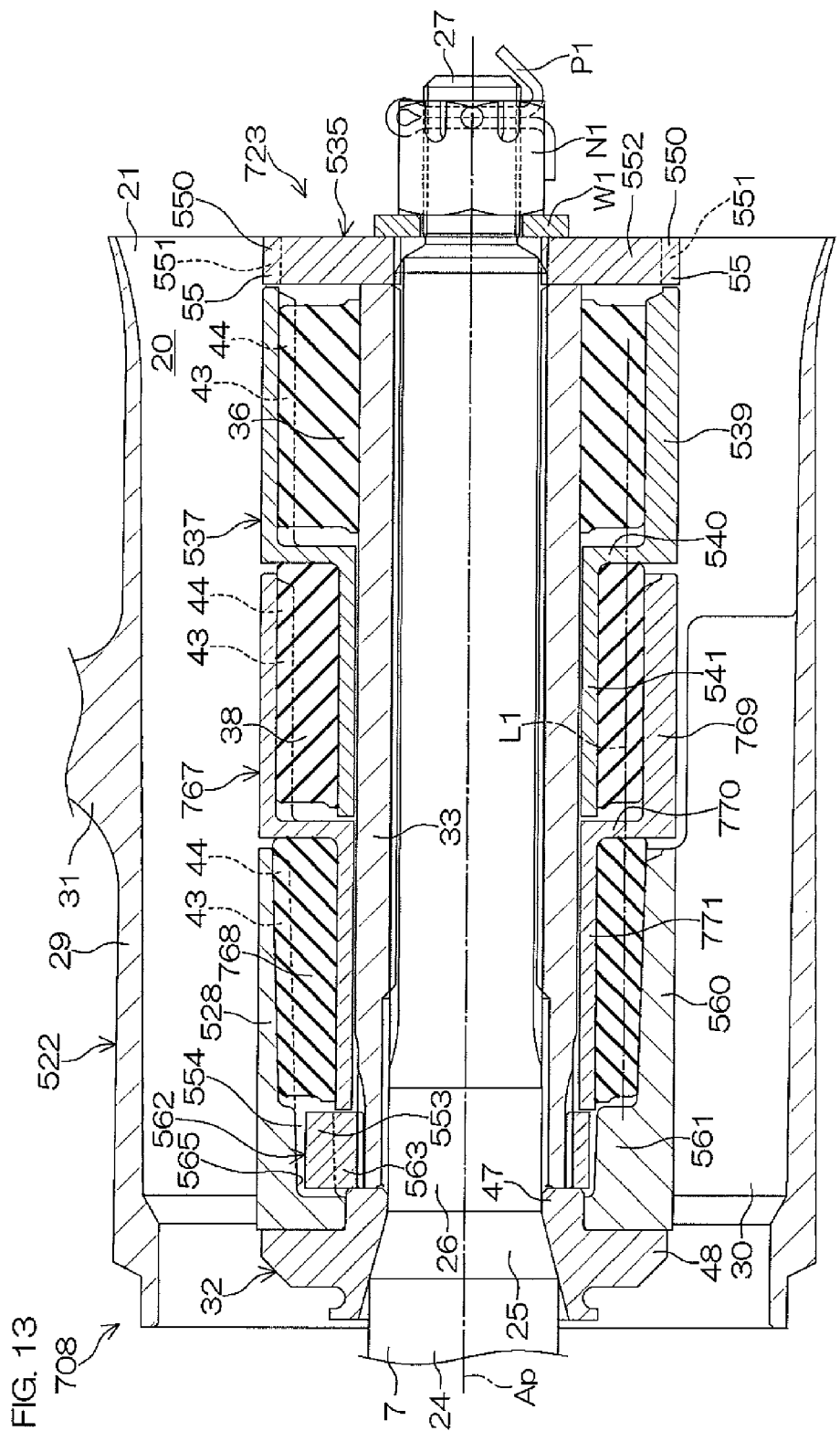
FIG. 13 is a sectional view of a propeller shaft and a propeller according to a seventh preferred embodiment of the present invention.

FIG. 13 is a sectional view of the propeller shaft 7 and a propeller 708 according to a seventh preferred embodiment of the present invention. A free state in which a torque is not applied to a damper unit 723 is illustrated in FIG. 13. In the following, the damper unit 723 in the free state shall be described unless noted otherwise. Also, in FIG. 13, component portions equivalent to respective portions shown in FIG. 1 to FIG. 12 described above shall be provided with the same reference symbols as in FIG. 1, etc., and description thereof shall be omitted.

The propeller 708 according to the seventh preferred embodiment includes the propeller member 522 according to the fifth preferred embodiment and the cylindrical damper unit 723 that is detachably mounted on the propeller member 522. The propeller 708 is detachably mounted on the rear end portion of the propeller shaft 7 by the washer W1 and the nut N1.

The damper unit 723 is disposed on the propeller axis Ap. The damper unit 723 is housed inside the outer cylinder 29 of the propeller member 522. In addition to the arrangement of the damper unit 523 according to the fifth preferred embodiment, the damper unit 723 further includes a second intermediate member 767, transmitting a torque from the second damper 38 to the downstream side, and a cylindrical third damper 768 transmitting the torque from the second intermediate member 767 to the propeller member 522.

The intermediate member 537 (shall hereinafter be referred to as the "first intermediate member 537" in regard to the seventh preferred embodiment) transmits the torque between the first damper 36 as a first upstream damper and the second damper 38 as a first downstream damper. Also, the second intermediate member 767 transmits the torque between the second damper 38 as a second upstream damper and the third damper 768 as a second downstream damper. The third damper 768 is made of an elastic material. The elastic moduli of the first damper 36, the second damper 38, and the third damper 768 may be equal or may differ.

In regard to the front/rear direction, the second intermediate member 767 is disposed between the inner cylinder 528 and the first intermediate member 537. The second intermediate member 767 extends in the front/rear direction along the propeller axis Ap. The second intermediate member 767 surrounds the sleeve 33 around the propeller axis Ap. The second intermediate member 767 includes an outer circumferential surface and inner circumferential surface that are step-shaped and change in diameter in a stepwise manner. The second intermediate member 767 includes an upstream cylindrical portion 769 coupled to the second damper 38, an annular step portion 770 defining a step at an intermediate portion of the second intermediate member 767, and a downstream cylindrical portion 771 coupled to the third damper 768. The upstream cylindrical portion 769 surrounds the second damper 38 and the downstream cylindrical portion 771 is surrounded by the third damper 768.

The upstream cylindrical portion 769 and the downstream cylindrical portion 771 extend in the front/rear direction along the propeller axis Ap. The upstream cylindrical portion 769 is disposed farther to the rear than the downstream cylindrical portion 771. The step portion 770 extends from a rear end of the downstream cylindrical portion 771 to a front end of the upstream cylindrical portion 769. The upstream cylindrical portion 769 and the step portion 770 are disposed farther to the rear than the inner cylinder 528, and the downstream cylindrical portion 771 is disposed inside the inner cylinder 528. The upstream cylindrical portion 769 is disposed between the cylindrical portion 560 of the inner cylinder 528 and the upstream cylindrical portion 539 of the first intermediate member 537. An inner diameter of the upstream cylindrical portion 769 is greater than an outer diameter of the downstream cylindrical portion 771. An outer diameter of the upstream cylindrical portion 769 is not more than the outer diameter of the cylindrical portion 560. An inner diameter of the downstream cylindrical portion 771 is greater than the outer diameter of the sleeve 33. The downstream cylindrical portion 771 surrounds the sleeve 33 at a radial interval.

The second damper 38 is disposed between the downstream cylindrical portion 541 of the first intermediate member 537 and the upstream cylindrical portion 769 of the second intermediate member 767, and the third damper 68 is disposed between the downstream cylindrical portion 771 of the second intermediate member 767 and the cylindrical portion 560 of the inner cylinder 528. The upstream cylindrical portion 769 of the second intermediate member 767 is disposed farther to the rear than the third damper 768, and the downstream cylindrical portion 771 of the second intermediate member 767 is disposed farther to the front than the second damper 38. The step portion 770 of the second intermediate member 767 defines the step interposed between the second damper 38 and the third damper 768. The front end surface of the second damper 38 and the rear end surface of the third damper 768 face the step portion 770. The second damper 38 and the third damper 768 are aligned in the front/rear direction via the step portion 770. A portion of the third damper 768 is disposed on the straight line L1 passing through the first damper 36 and the second damper 38 and is parallel or substantially parallel to the propeller axis Ap.

The inner circumferential portion of the second damper 38 rotates around the propeller axis Ap together with the downstream cylindrical portion 541 of the first intermediate member 537, and the outer circumferential portion of the second damper 38 rotates around the propeller axis Ap together with the upstream cylindrical portion 769 of the second intermediate member 767. The inner circumferential portion of the second damper 38 is coupled by adhesion to the outer circumferential portion of the downstream cylindrical portion 541 of the first intermediate member 537, and the outer circumferential portion of the second damper 38 is coupled by a tooth and groove engagement to an inner circumferential portion of the upstream cylindrical portion 769 of the second intermediate member 767. The second damper 38 may be coupled by a tooth and groove engagement to the first intermediate member 537 and coupled by adhesion to the second intermediate member 767.

An inner circumferential portion of the third damper 768 rotates around the propeller axis Ap together with the downstream cylindrical portion 771 of the second intermediate member 767, and an outer circumferential portion of the third damper 768 rotates around the propeller axis Ap together with the inner circumferential portion of the inner cylinder 528. The inner circumferential portion of the third damper 768 is coupled by adhesion to an outer circumferential portion of the downstream cylindrical portion 771 of the second intermediate member 767, and the outer circumferential portion of the third damper 768 is coupled by a tooth and groove engagement to the inner circumferential portion of the inner cylinder 528. The third damper 768 may be coupled by a tooth and groove engagement to the second intermediate member 767 and coupled by adhesion to the inner cylinder 528.

The upstream cylindrical portion 769 of the second intermediate member 767 includes an uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the upstream cylindrical portion 769 in a state in which the plurality of teeth 43 are engaged with the second damper 38.

The cylindrical portion 560 of the inner cylinder 528 includes an uneven inner circumferential surface provided with the plurality of radially projecting teeth 43. The third damper 768 includes an uneven outer circumferential surface provided with the plurality of radially recessed grooves 44. The plurality of teeth 43 are respectively disposed inside the plurality of grooves 44. The outer circumferential surface of the third damper 768 is in close contact with the inner circumferential surface of the inner cylinder 528 in a state in which the plurality of teeth 43 are engaged with the third damper 768.

When a torque applied to the propeller shaft 7 is less than a maximum torque (torque corresponding to a maximum operating angle) of the damper unit 723, the torque transmitted to the propeller shaft 7 is transmitted from the sleeve 33 to the first damper 36. The torque transmitted to the first damper 36 is then transmitted from the first intermediate member 537 to the second damper 38. The torque transmitted to the second damper 38 is transmitted from the second intermediate member 767 to the third damper 768. The torque transmitted to the third damper 768 is transmitted to the inner cylinder 528 of the propeller member 522. The torque around the propeller axis Ap is thus transmitted from the propeller shaft 7 to the propeller member 522 via the damper unit 723.

Eighth Preferred Embodiment

Figure 14:
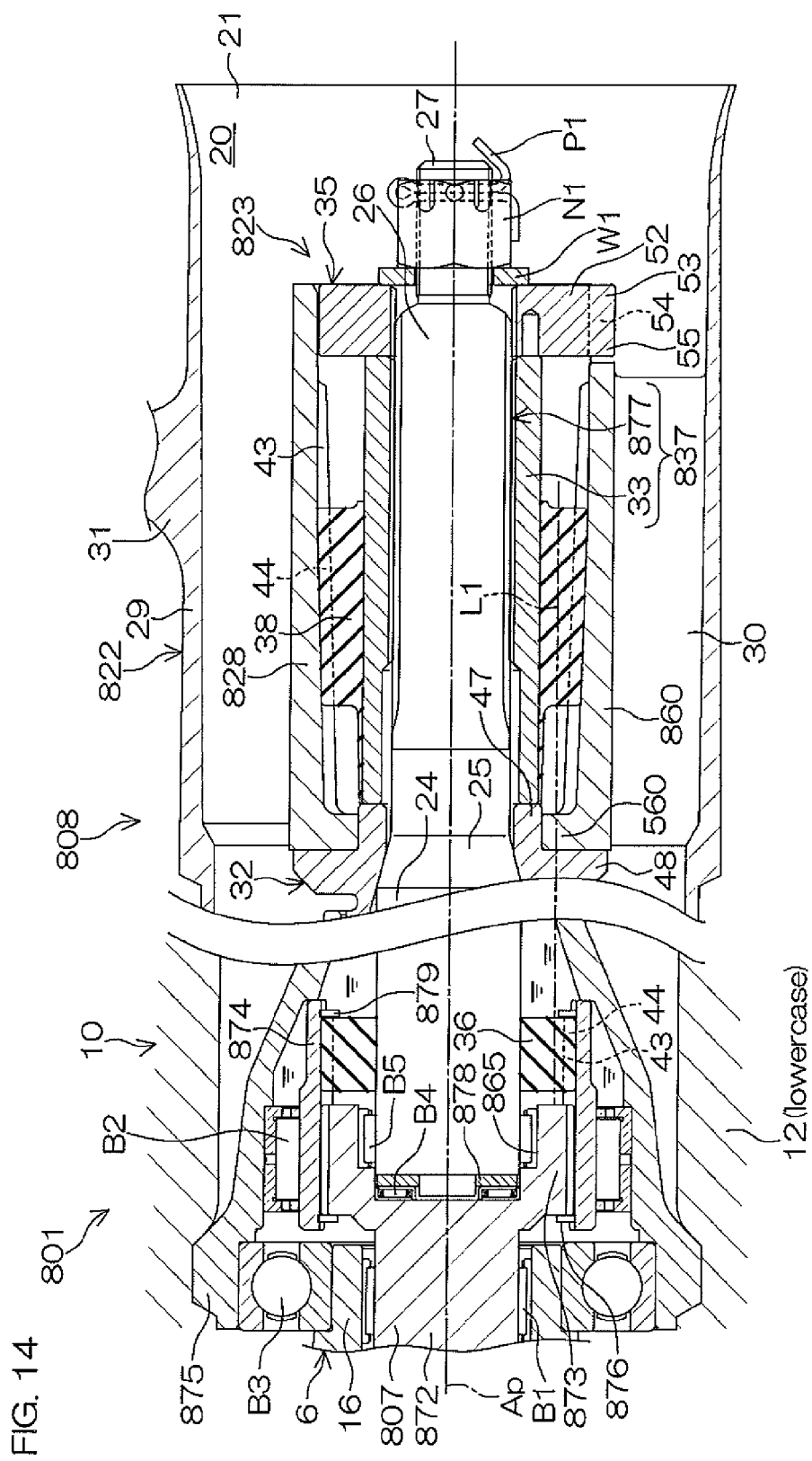
FIG. 14 is a sectional view of a portion of a vessel propulsion apparatus according to an eighth preferred embodiment of the present invention.

FIG. 14 is a sectional view of a vessel propulsion apparatus 801 according to an eighth preferred embodiment of the present invention. A free state in which a torque is not applied to a damper unit 823 is illustrated in FIG. 14. In the following, the damper unit 823 in the free state shall be described unless noted otherwise. Also, in FIG. 14, component portions equivalent to respective portions shown in FIG. 1 to FIG. 13 described above shall be provided with the same reference symbols as in FIG. 1, etc., and description thereof shall be omitted.

With the exception of the propeller shaft, the propeller, and the damper unit, the vessel propulsion apparatus 801 preferably has the same arrangement as the vessel propulsion apparatus 1 according to the first preferred embodiment. Specifically, the vessel propulsion apparatus 801 includes, in place of the propeller shaft 7 according to the first preferred embodiment, a propeller shaft 807 coupled to the forward/reverse drive switching mechanism 6.

The propeller shaft 807 extends in the front/rear direction inside the lower case 12. The propeller shaft 807 is rotatable around the propeller axis Ap with respect to the casing 10. The propeller shaft 807 penetrates through the cylindrical rear gear 16, provided in the forward/reverse drive switching mechanism 6, in the front/rear direction. A rear end portion of the propeller shaft 807 projects rearward from the rear gear 16. The rear end portion of the propeller shaft 807 is disposed inside the lower case 12.

The propeller shaft 807 includes a columnar small diameter portion 872 extending in the front/rear direction along the propeller axis Ap and a large diameter portion 873 disposed behind the small diameter portion 872. The small diameter portion 872 is supported by the rear gear 16 via a roller bearing B1 disposed inside the rear gear 16. The large diameter portion 873 is disposed behind the rear gear 16. The large diameter portion 873 is coaxial to the small diameter portion 872. The large diameter portion 873 is thicker than the small diameter portion 872. An outer diameter of the large diameter portion 873 is thus greater than an inner diameter of the rear gear 16. The large diameter portion 873 includes a circular columnar recessed portion 865 that is recessed forward from a rear end surface of the large diameter portion 873.

The vessel propulsion apparatus 801 includes a cylindrical supporting member 874 supporting the rear end portion of the propeller shaft 807, a roller bearing B2 supporting the supporting member 874 in a manner enabling rotation around the propeller axis Ap, and a ball bearing B3 supporting a rear end portion of the rear gear 16 in a manner enabling rotation around the propeller axis Ap. Further, the vessel propulsion apparatus 801 includes a cylindrical bearing housing 875 housing the supporting member 874, the roller bearing B2, and the ball bearing B3.

The bearing housing 875 is disposed inside the lower case 12. The supporting member 874, the roller bearing B2, and the ball bearing B3 are thus also disposed inside the lower case 12. The bearing housing 875 has a cylindrical shape extending in the front/rear direction along the propeller axis Ap. An interior of the bearing housing 875 is filled with oil, which is an example of a lubricant. The bearing housing 875 is held by the lower case 12.

Inside the bearing housing 875, the supporting member 874 surrounds the rear end portion of the propeller shaft 807 around the propeller axis Ap. The supporting member 874 extends in the front/rear direction along the propeller axis Ap. A front end portion of the supporting member 874 is disposed farther to the rear than the rear gear 16 and the roller bearing B2, and a rear end portion of the supporting member 874 is disposed farther to the rear than the propeller shaft 807. The rear end portion of the supporting member 874 is supported from the rear by a step provided on an inner circumferential surface of the bearing housing 875. Inside the bearing housing 875, the roller bearing B2 surrounds the supporting member 874 around the propeller axis Ap. The roller bearing B2 and the supporting member 874 are disposed behind the ball bearing B3.

The supporting member 874 is supported by the roller bearing B2 in a manner enabling rotation around the propeller axis Ap. The roller bearing B2 is supported by the bearing housing 875. The supporting member 874 is thus held by the bearing housing 875 via the roller bearing B2. The large diameter portion 873 of the propeller shaft 807 is fitted inside the supporting member 874. Inside the front end portion of the supporting member 874, the large diameter portion 873 is restricted in forward movement by a front ring 876 that surrounds the propeller shaft 807. An inner circumferential portion of the supporting member 874 is spline-connected to an outer circumferential portion of the large diameter portion 873. The supporting member 874 thus rotates around the propeller axis Ap together with the propeller shaft 807.

In place of the propeller 8 and the damper unit 23 according to the first preferred embodiment, the vessel propulsion apparatus 801 includes a damper unit 823 coupled to the propeller shaft 807 and a propeller 808 coupled to the propeller shaft 807 via the damper unit 823. The damper unit 823 is disposed on a transmission path transmitting the rotation of the engine 4 (see FIG. 1) to the plurality of blades 31 of the propeller 808. The rotation of the engine 4 is thus transmitted to the propeller 808 via the damper unit 823.

The propeller 808 includes a cylindrical propeller member 822 that generates a thrust. The propeller member 822 includes an inner cylinder 828 surrounding the damper unit 823 around the propeller axis Ap, the outer cylinder 29 surrounding the inner cylinder 828 coaxially at a radial interval, the plurality of ribs 30 coupling the inner cylinder 828 and the outer cylinder 29 at the plurality of positions that are separated in the circumferential direction, and the plurality of blades 31 extending outward from the outer cylinder 29. The inner cylinder 828 includes a cylindrical portion 860 extending in the front/rear direction along the propeller axis Ap and the disk-shaped front flange 561 provided at a front end portion of the cylindrical portion 860. The propeller 808 is detachably mounted on the damper unit 823 by the washer W1 and the nut N1.

The damper unit 823 is disposed on the propeller axis Ap. A portion of the damper unit 823 is housed inside the lower case 12, and a remaining portion of the damper unit 823 is housed inside the propeller 808. The damper unit 823 includes an intermediate member 837 extending rearward along the propeller axis Ap from the rear end portion of the propeller shaft 807. The intermediate member 837 may be a single integral member or may include a plurality of members integrally coupled. A case in which the intermediate member 837 includes the plurality of members is illustrated in FIG. 14. The intermediate member 837 includes an intermediate shaft 877 and the sleeve 33 that rotate integrally around the propeller axis Ap. The intermediate shaft 877 extends rearward along the propeller axis Ap from the rear end portion of the propeller shaft 807.

The intermediate shaft 877 includes the large diameter portion 24, the tapered portion 25, the small diameter portion 26, and the bolt portion 27 that are columnar and extend in the front/rear direction along the propeller axis Ap. The large diameter portion 24, the tapered portion 25, the small diameter portion 26, and the bolt portion 27 are aligned in that order in the front/rear direction from the front. The large diameter portion 24 is thicker than the small diameter portion 26 and the small diameter portion 26 is thicker than the bolt portion 27. The tapered portion 25 extends from the rear end of the large diameter portion 24 to the front end of the small diameter portion 26 and is tapered toward the small diameter portion 26. The intermediate shaft 877 extends in the front/rear direction inside the lower case 12 and projects rearward from the lower case 12. The large diameter portion 24 is disposed inside the lower case 12, and the tapered portion 25, the small diameter portion 26, and the bolt portion 27 are disposed inside the propeller 808.

The large diameter portion 24 of the intermediate shaft 877 is disposed inside the bearing housing 875. The large diameter portion 24 of the intermediate shaft 877 is inserted inside the supporting member 874. The large diameter portion 24 of the intermediate shaft 877 extends rearward from the supporting member 874. A front end portion of the intermediate shaft 877 (large diameter portion 24) is fitted inside the circular columnar recessed portion 865 provided in the rear end portion (large diameter portion 873) of the propeller shaft 807. The front end portion of the intermediate shaft 877 is supported in the front/rear direction by the rear end portion of the propeller shaft 807 via the roller bearing B3 and a plate 878 that are disposed between a bottom surface of the recessed portion 865 and a front end surface of the intermediate shaft 877. Further, the front end portion of the intermediate shaft 877 is radially supported by the rear end portion of the propeller shaft 807 via the roller bearing B3 disposed along an inner circumferential surface of the recessed portion 865. The propeller shaft 807 and the intermediate shaft 877 can undergo relative rotation around the propeller axis Ap.

The damper unit 823 includes the cylindrical first damper 36 transmitting a torque between the supporting member 874 and the intermediate shaft 877. The first damper 36 is disposed in the interior of the supporting member 874 that is filled with the oil. The first damper 36 is thus disposed inside the lower case 12. The first damper 36 surrounds the intermediate shaft 877 around the propeller axis Ap. The first damper 36 is disposed between an inner circumferential surface of the supporting member 874 and an outer circumferential surface of the intermediate shaft 877. The first damper 36 extends in the front/rear direction along the propeller axis Ap. The rear end of the first damper 36 is disposed farther to the front than a rear end of the supporting member 874.

The inner circumferential portion of the first damper 36 is coupled by adhesion to an outer circumferential portion of the intermediate shaft 877 and the outer circumferential portion of the first damper 36 is coupled by a tooth and groove engagement to an inner circumferential portion of the supporting member 874. The inner circumferential portion of the first damper 36 rotates around the propeller axis Ap together with the intermediate shaft 877, and the outer circumferential portion of the first damper 36 rotates around the propeller axis Ap together with the supporting member 874. The first damper 36 may be coupled by a tooth and groove engagement to the intermediate shaft 877 and coupled by adhesion to the supporting member 874.

The supporting member 874 includes an uneven inner circumferential surface provided with the plurality of radially projecting teeth 43. The first damper 36 includes the uneven outer circumferential surface provided with the plurality of radially recessed grooves 44. The plurality of teeth 43 are respectively disposed inside the plurality of grooves 44. The outer circumferential surface of the first damper 36 is in close contact with the inner circumferential surface of the supporting member 874 in a state in which the plurality of teeth 43 are engaged with the first damper 36. The first damper 36 is restricted in rearward movement by a rear ring 879 surrounding the intermediate shaft 877 inside the rear end portion of the supporting member 874.

The damper unit 823 includes the cylindrical front spacer 32 and rear spacer 35 that are mounted on the intermediate shaft 877. The front spacer 32 is disposed in front of the sleeve 33 and the rear spacer 35 is disposed behind the sleeve 33. The front spacer 32, the sleeve 33, and the rear spacer 35 are thus aligned in that order in the front/rear direction from the front. The front spacer 32, the sleeve 33, and the rear spacer 35 surround the intermediate shaft 877 around the propeller axis Ap. The front spacer 32 is mounted on a front end portion of the inner cylinder 828 and the rear spacer 85 is mounted on a rear end portion of the inner cylinder 828. The sleeve 33 is disposed inside the inner cylinder 828.

Forward movement of the front spacer 32 with respect to the intermediate shaft 877 is restricted by contact of the outer circumferential surface of the tapered portion 25 and the inner circumferential surface of the front spacer 32. The inner circumferential portion of the sleeve 33 and the inner circumferential portion of the rear spacer 35 are spline-connected to the small diameter portion 26 of the intermediate shaft 877. The front spacer 32, the sleeve 33, and the rear spacer 35 are fixed to the intermediate shaft 877 by the washer W1 and the nut N1 mounted on the bolt portion 27 of the intermediate shaft 877. The intermediate shaft 877, the front spacer 32, the sleeve 33, and the rear spacer 35 thus rotate integrally around the propeller axis Ap.

The damper unit 823 includes the second damper 38 that transmits a torque between the sleeve 33 and the inner cylinder 828. The second damper 38 is disposed between the outer circumferential surface of the sleeve 33 and an inner circumferential surface of the inner cylinder 828. The second damper 38 is thus disposed in an interior of the inner cylinder 828 that is disposed underwater. The second damper 38 surrounds the sleeve 33 around the propeller axis Ap. The second damper 38 extends in the front/rear direction. The front end portion of the second damper 38 surrounds the front end portion of the sleeve 33, and the rear end portion of the second damper 38 is disposed farther to the front than the rear end portion of the sleeve 33. In regard to the front/rear direction, the second damper 38 is disposed between the front spacer 32 and the rear spacer 35. The rear spacer 35 faces the second damper 38 at an interval in the front/rear direction. A portion of the second damper 38 is positioned on the straight line L1 passing through the first damper 36 and is parallel or substantially parallel to the propeller axis Ap.

The inner circumferential portion of the second damper 38 is coupled by adhesion to the outer circumferential portion of the sleeve 33 and the outer circumferential portion of the second damper 38 is coupled by a tooth and groove engagement to an inner circumferential portion of the inner cylinder 828. The inner circumferential portion of the second damper 38 rotates around the propeller axis Ap together with the sleeve 33, and the outer circumferential portion of the second damper 38 rotates around the propeller axis Ap together with the inner cylinder 828. The second damper 38 may be coupled by a tooth and groove engagement to the sleeve 33 and coupled by adhesion to the inner cylinder 828.

The inner cylinder 828 includes an uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the inner cylinder 828 in a state in which the plurality of teeth 43 are engaged with the second damper 38. The inner circumferential surface of the inner cylinder 828 is tapered toward the front end of the inner cylinder 828. The second damper 38 is thus restricted in forward movement by an inclination of the inner circumferential surface of the inner cylinder 828.

When a torque applied to the propeller shaft 807 is less than a maximum torque (torque corresponding to a maximum operating angle) of the damper unit 823, the torque transmitted to the propeller shaft 807 is transmitted from the supporting member 874 to the first damper 36. The torque transmitted to the first damper 36 is transmitted from the intermediate shaft 877 to the sleeve 33 and transmitted further from the sleeve 33 to the second damper 38. The torque transmitted to the second damper 38 is transmitted to the inner cylinder 828 of the propeller member 822. The torque around the propeller axis Ap is thus transmitted from the propeller shaft 807 to the propeller member 822 via the damper unit 823.

Ninth Preferred Embodiment

FIG. 15 is a sectional view of a portion of a vessel propulsion apparatus 901 according to a ninth preferred embodiment of the present invention. A free state in which a torque is not applied to a damper unit 923 is illustrated in FIG. 15. In the following, the damper unit 923 in the free state shall be described unless noted otherwise. Also, in FIG. 15, component portions equivalent to respective portions shown in FIG. 1 to FIG. 14 described above shall be provided with the same reference symbols as in FIG. 1, etc., and description thereof shall be omitted.

In addition to the arrangement of the vessel propulsion apparatus 1 according to the first preferred embodiment, the vessel propulsion apparatus 901 includes a damper unit 923 disposed on a transmission path transmitting the rotation of the engine 4 (see FIG. 1) to the plurality of blades 31 (see FIG. 1) of the propeller 8. The damper unit 923 is housed inside the casing 10. The damper unit 923 is disposed on the drive axis Ad. The damper unit 923 is disposed higher than the water pump WP (see FIG. 1) disposed on the drive axis Ad. The damper unit 923 may be disposed lower than the water pump WP.

The driveshaft 5 includes a plurality of shafts (a first shaft 979, a second shaft 980, and a third shaft 981) extending in the up/down direction along the drive axis Ad. The first shaft 979 is disposed above the second shaft 980, and the second shaft 980 is disposed above the third shaft 981. The first shaft 979 is thus disposed farther to the upstream side than the second shaft 980 on the transmission path, and the second shaft 980 is disposed farther to the upstream side than the third shaft 981 on the transmission path.

The second shaft 980 includes a cylindrical upper portion 982 defining an upper recessed portion that is opened upward, cylindrical lower portion 983 defining a lower recessed portion that is opened downward, and a disk-shaped partition portion 984 partitioning the upper recessed portion and the lower recessed portion. The upper portion 982 and the lower portion 983 have cylindrical shapes extending in the up/down direction. An outer diameter and an inner diameter of the upper portion 982 are greater than an outer diameter and an inner diameter of the lower portion 983. A lower end portion of the first shaft 979 is inserted inside the upper portion 982, and an upper end portion of the third shaft 981 is inserted inside the lower portion 983. The lower end portion of the first shaft 979 and the upper end portion of the third shaft 981 face each other in the up/down direction via the partition portion 984. The first shaft 979 is coupled via the damper unit 923 to the second shaft 980 and an outer circumferential portion of the third shaft 981 is spline-connected to an inner circumferential portion of the lower portion 983. The second shaft 980 and the third shaft 981 can thus undergo relative movement in the up/down direction and rotate integrally around the drive axis Ad.

The damper unit 923 transmits a torque around the drive axis Ad between the first shaft 979 as an input member and the second shaft 980 as an output member and absorbs a vibration around the drive axis Ad between the first shaft 979 and the second shaft 980. The damper unit 923 includes the cylindrical sleeve 33 and the main stopper 562 that are mounted on the first shaft 979. Further, the damper unit 923 includes the cylindrical first damper 36 transmitting the torque from the sleeve 33 to the downstream side, a cylindrical intermediate member 937 transmitting the torque from the first damper 36 to the downstream side, and the cylindrical second damper 38 transmitting the torque from the intermediate member 937 to the second shaft 980.

The sleeve 33 and the main stopper 562 extend in the up/down direction along the drive axis Ad. The sleeve 33 and the main stopper 562 are aligned in that order in the up/down direction from above. The sleeve 33 is longer in the up/down direction than the main stopper 562. The outer diameter of the sleeve 33 is smaller than the outer diameter of the main stopper 562. The sleeve 33 and the main stopper 562 are disposed inside the second shaft 980. The sleeve 33 projects upward from an upper end portion of the second shaft 980. The sleeve 33 and the main stopper 562 surround the first shaft 979 around the drive axis Ad. The inner circumferential portions of the sleeve 33 and the main stopper 562 are spline-connected to an outer circumferential portion of the first shaft 979. The sleeve 33 and the main stopper 562 are thus movable in the up/down direction with respect to the first shaft 979 and rotate around the drive axis Ad together with the first shaft 979.

The main stopper 562 is disposed inside a recessed portion 965 defined by the partition portion 984. The recessed portion 965 is recessed downward. The main stopper 562 includes the disk-shaped main body 563 surrounding a lower end portion of the first shaft 979 around the drive axis Ad and the two main projections 553 extending radially outward from the outer circumferential surface of the main body 563. The two main projections 553 are disposed farther radially outward than the lower end of the sleeve 33. The two main projections 553 are disposed at an interval in the circumferential direction (direction around the drive axis Ad).

The main body 563 is disposed inside the recessed portion 965 of the partition portion 984, and the two main projections 553 are respectively disposed inside the two main notches 554 provided in the recessed portion 965. The main notches 554 extend downward from an upper end of the partition portion 984 and open upward. Each main notch 554 is defined by the pair of inner surfaces disposed at an interval in the circumferential direction and the bottom surface connecting lower ends of the pair of inner surfaces to each other. The width (length in the circumferential direction) of each main projection 553 is shorter than the width of each main notch 554, and in the free state, the centers of the main projections 553 in the circumferential direction are matched with the centers of the main notches 554 in the circumferential direction. The pair of side surfaces of each main projection 553 thus face the pair of inner surfaces of a main notch 554 at intervals in the circumferential direction.

The inner circumferential portion of the main stopper 562 is spline-connected to an outer circumferential portion of the first shaft 979. The main stopper 562 thus rotates around the drive axis Ad together with the first shaft. On the other hand, the second shaft 980 can undergo relative rotation around the drive axis Ad with respect to the first shaft 979. Therefore, in a state in which the side surfaces of the main projections 553 are not in contact with the inner surfaces of the main notches 554, the main stopper 562 and the second shaft 980 can undergo relative rotation in the circumferential direction. When the main stopper 562 and the second shaft 980 undergo relative rotation around the drive axis Ad and side surfaces of the main projections 553 contact inner surfaces of the main notches 554, the relative rotation of the main stopper 562 and the second shaft 980 in one rotation direction is restricted. The first shaft 979 and the second shaft 980 are thus coupled together by the main stopper 562 and rotate integrally around the drive axis Ad.

The intermediate member 937 includes an inner circumferential surface and outer circumferential surface that are step-shaped and change in diameter in a stepwise manner. The intermediate member 937 includes an upstream cylindrical portion 939 coupled to the first damper 36, an annular step portion 940 defining a step at an intermediate portion of the intermediate member 937, and a downstream cylindrical portion 941 coupled to the second damper 38.

The upstream cylindrical portion 939 surrounds the first damper 36 and the downstream cylindrical portion 941 is surrounded by the second damper 38. The upstream cylindrical portion 939 and the downstream cylindrical portion 941 extend in the up/down direction along the drive axis Ad. The upstream cylindrical portion 939 is disposed higher than the downstream cylindrical portion 941. The step portion 940 extends from a lower end of the upstream cylindrical portion 939 to an upper end of the downstream cylindrical portion 941. An inner diameter of the upstream cylindrical portion 939 is greater than an outer diameter of the downstream cylindrical portion 941. An inner diameter of the downstream cylindrical portion 941 is greater than the outer diameter of the sleeve 33. The downstream cylindrical portion 941 surrounds the sleeve 33 across a radial interval (in directions orthogonal or substantially orthogonal to the drive axis Ad).

The upstream cylindrical portion 939 is disposed higher than the second damper 38. The downstream cylindrical portion 941 is disposed lower than the first damper 36. The step portion 940 defines the step interposed between the first damper 36 and the second damper 38. The lower end surface of the first damper 36 and the upper end surface of the second damper 38 face the step portion 940. The first damper 36 and the second damper 38 are aligned in the up/down direction via the step portion 940. A portion of the second damper 38 is disposed on the straight line L1 passing through the first damper 36 and is parallel or substantially parallel to the drive axis Ad.

The first damper 36 is disposed between the outer circumferential surface of the sleeve 33 and an inner circumferential surface of the upstream cylindrical portion 939. The inner circumferential portion of the first damper 36 is coupled by adhesion to the outer circumferential portion of the sleeve 33, and the outer circumferential portion of the first damper 36 is coupled by a tooth and groove engagement to the inner circumferential portion of the upstream cylindrical portion 939. Similarly, the second damper 38 is disposed between an outer circumferential surface of the downstream cylindrical portion 941 and an inner circumferential surface of the second shaft 980. The inner circumferential portion of the second damper 38 is coupled by adhesion to the outer circumferential surface of the downstream cylindrical portion 941 and the outer circumferential portion of the second damper 38 is coupled by a tooth and groove engagement to the inner circumferential portion of the second shaft 980. The first damper 36 may be coupled by a tooth and groove engagement to the sleeve 33 and coupled by adhesion to the upstream cylindrical portion 939. The same applies to the second damper 38.

The upstream cylindrical portion 939 includes an uneven inner circumferential surface provided with the plurality of radially projecting teeth 43. The first damper 36 includes the uneven outer circumferential surface provided with the plurality of radially recessed grooves 44. The plurality of teeth 43 are respectively disposed inside the plurality of grooves 44. The outer circumferential surface of the first damper 36 is in close contact with the inner circumferential surface of the upstream cylindrical portion 939 in a state in which the plurality of teeth 43 are engaged with the first damper 36. The inner circumferential surface of the upstream cylindrical portion 939 is tapered toward the lower end of the upstream cylindrical portion 939. The first damper 36 is thus restricted in downward movement by an inclination of the outer circumferential surface of the upstream cylindrical portion 939.

The upper portion 982 of the second shaft 980 includes an uneven inner circumferential surface provided with the plurality of radially projecting teeth 43. The second damper 38 includes the uneven outer circumferential surface provided with the plurality of radially recessed grooves 44. The plurality of teeth 43 are respectively disposed inside the plurality of grooves 44. The outer circumferential surface of the second damper 38 is in close contact with the inner circumferential surface of the second shaft 980 in a state in which the plurality of teeth 43 are engaged with the second damper 38. The inner circumferential surface of the second shaft 980 becomes narrower as the front end of the second shaft 980 is approached. The second damper 38 is thus restricted in downward movement by an inclination of the inner circumferential surface of the second shaft 980.

When the torque applied to the first shaft 979 of the driveshaft 5 is less than a maximum torque (torque corresponding to a maximum operating angle) of the damper unit 923, the torque transmitted to the first shaft 979 is transmitted from the sleeve 33 to the first damper 36. The torque transmitted to the first damper 36 is then transmitted from the intermediate member 937 to the second damper 38. The torque transmitted to the second damper 38 is transmitted from the second shaft 980 to the third shaft 981. The torque transmitted to the third shaft 981 is then transmitted to the propeller 8 via the forward/reverse drive switching mechanism 6 and the propeller shaft 7. The torque around the drive axis Ad is thus transmitted from the first shaft 979 as the input member to the second shaft 980 as the output member via the damper unit 923.

Other Preferred Embodiments

Although the first to ninth preferred embodiments of the present invention have been described above, the present invention is not restricted to the contents of the first to ninth preferred embodiments and various modifications are possible within the scope of the claims.

For example, with the first preferred embodiment, a case in which the first damper is preferably coupled to the propeller shaft via the sleeve that is detachably mounted on the propeller shaft was described. However, the first damper may be coupled directly to the propeller shaft. Similarly, with each of the second to ninth preferred embodiments, the first damper may be coupled directly to any of the propeller shaft, the intermediate shaft, and the driveshaft without involvement of the sleeve.

Also, with each of the first and fifth to seventh preferred embodiments, a case in which the damper unit is preferably provided with both the main stopper and the sub stopper was described. However, the sub stopper may be omitted and the damper unit may be provided with just the main stopper.

Also, with each of the second to fourth, eighth, and ninth preferred embodiments, a case in which the damper unit is preferably provided with only the main stopper was described. However, the damper unit may be provided with both the main stopper and the sub stopper.

Also, with the first and fifth to seventh preferred embodiments, a case in which the main stopper preferably causes the input member (propeller shaft) and the output member (inner cylinder of the propeller member) to rotate integrally, and the sub stopper causes the input member and the intermediate member to rotate integrally was described. However, the sub stopper may cause the output member and the intermediate member to rotate integrally. Also, the main stopper may cause the input member and the intermediate member to rotate integrally and the sub stopper may cause the output member and the intermediate member to rotate integrally.

Also, with each of the first to seventh preferred embodiments, a case in which the damper unit preferably is disposed on the propeller axis and the entire damper unit is housed inside the propeller member was described. Also, with the eighth preferred embodiment, a case in which the damper unit is disposed on the propeller axis, a portion of the damper unit is housed inside the casing of the vessel propulsion apparatus, and the remaining portion of the damper unit is disposed inside the propeller was described. However, the damper unit may be disposed on the propeller axis and the entire damper unit may be housed inside the casing. For example, the damper unit may be disposed inside a frame X1 of alternate long and short dashed line shown in FIG. 1.

Also, with each of the first to ninth preferred embodiments, a case in which the vessel propulsion apparatus preferably is an outboard motor was described. However, the vessel propulsion apparatus may be a propulsion system other than an outboard motor. For example, the vessel propulsion apparatus may be an inboard/outboard motor. Similarly, with each of the first to ninth preferred embodiments, a case in which the propeller including the damper unit preferably is used in the outboard motor was described. However, the propeller including the damper unit may be used in an inboard/outboard motor or other propulsion system besides the outboard motor.

The present application corresponds to Japanese Patent Application No. 2012-160977 filed on Jul. 19, 2012 in the Japan Patent Office, the entire disclosure of which is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A damper unit for a vessel propulsion apparatus that transmits a torque between an input member and an output member, the input member and the output member being disposed on a transmission path in which a rotation of a prime mover is transmitted to a plurality of blades, and that absorbs a vibration between the input member and the output member, the damper unit comprising:
   a first damper arranged to transmit a first torque around a rotation axis, the first torque being transmitted from an input member side, to an output member side;
   an intermediate member arranged to transmit a second torque around the rotation axis, the second torque being transmitted from the first damper to the output member side; and
   a second damper arranged to transmit a third torque around the rotation axis, the third torque being transmitted from the intermediate member to the output member side, and at least a portion of the second damper is disposed on a straight line that passes through the first damper and is parallel or substantially parallel to the rotation axis; wherein
   one of the first damper and the second damper is surrounded by the intermediate member and the other of the first damper and the second damper surrounds the intermediate member.

2. The damper unit according to claim 1, further comprising a main stopper arranged to restrict a relative rotation of the input member and the output member to cause the input member and the output member to rotate integrally when a maximum torque around the rotation axis transmitted to the damper unit exceeds a predetermined value.

3. The damper unit according to claim 2, further comprising a sub stopper arranged to restrict a relative rotation of one of the input member or the output member with respect to the intermediate member to cause the one of the input member or the output member to rotate integrally with the intermediate member when the maximum torque around the rotation axis transmitted to the damper unit exceeds the predetermined value.

4. The damper unit according to claim 1, wherein the first damper, the intermediate member, and the second damper are housed in a common housing.

5. The damper unit according to claim 1, wherein the intermediate member includes an upstream cylindrical portion coupled to the first damper and surrounding the first damper, and a downstream cylindrical portion coupled to the second damper and surrounded by the second damper and having a smaller outer diameter than the upstream cylindrical portion.

6. The damper unit according to claim 5, wherein the intermediate member further includes a cylindrical step portion extending from the upstream cylindrical portion to the downstream cylindrical portion and defining a step interposed between the first damper and the second damper.

7. The damper unit according to claim 1, wherein each of the first damper and the second damper is made of rubber or resin.

8. A propeller for a vessel propulsion apparatus comprising:
   the damper unit according to claim 1; and
   a propeller member including an inner cylinder as the output member surrounding the damper unit, an outer cylinder as a housing surrounding the damper unit and the inner cylinder, and a plurality of blades extending outward from the outer cylinder.

9. The propeller for a vessel propulsion apparatus according to claim 8, further comprising:
   a front member mounted on a propeller shaft and supporting a front end portion of the inner cylinder, the propeller shaft corresponding to the input member and being rotatable around the rotation axis; and a rear member mounted on the propeller shaft and supporting a rear end portion of the inner cylinder.

10. The propeller for a vessel propulsion apparatus according to claim 9, wherein the front member includes a front pressed portion that is pressed forward by the inner cylinder, and the rear member includes a rear pressed portion that is pressed rearward by the inner cylinder.

11. The propeller for a vessel propulsion apparatus according to claim 9, wherein the inner cylinder entirely houses the first damper, the intermediate member, and the second damper.

12. A vessel propulsion apparatus comprising:
- a prime mover;
- a driveshaft rotatable around a drive axis, extending in an up/down direction, and to which a rotation from the prime mover is transmitted;
- a propeller shaft rotatable around a propeller axis, the propeller axis intersecting the drive axis, and to which a rotation from the driveshaft is transmitted;
- a propeller member rotatable around the propeller axis and to which a rotation from the propeller shaft is transmitted; and
- the damper unit according to claim 1 disposed on a transmission path in which the rotation of the prime mover is transmitted to the propeller member via the driveshaft and the propeller shaft.

13. The vessel propulsion apparatus according to claim 12, wherein the damper unit is disposed on the propeller axis.

14. The vessel propulsion apparatus according to claim 13, wherein the damper unit is housed inside the propeller member.

* * * * *